United States Patent
Hohl et al.

(10) Patent No.: US 11,199,242 B2
(45) Date of Patent: Dec. 14, 2021

(54) BIT SUPPORT ASSEMBLY INCORPORATING DAMPER FOR HIGH FREQUENCY TORSIONAL OSCILLATION

(71) Applicants: Andreas Hohl, Hannover (DE); Sasa Mihajlovic, Hannover (DE)

(72) Inventors: Andreas Hohl, Hannover (DE); Sasa Mihajlovic, Hannover (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 180 days.

(21) Appl. No.: 16/568,789

(22) Filed: Sep. 12, 2019

(65) Prior Publication Data

US 2020/0018377 A1    Jan. 16, 2020

Related U.S. Application Data

(63) Continuation-in-part of application No. 16/353,090, filed on Mar. 14, 2019.

(60) Provisional application No. 62/643,291, filed on Mar. 15, 2018.

(51) Int. Cl.
   | | |
   |---|---|
   | *E21B 17/042* | (2006.01) |
   | *F16F 15/12* | (2006.01) |
   | *E21B 47/16* | (2006.01) |
   | *G01H 1/10* | (2006.01) |

(52) U.S. Cl.
   CPC ........ *F16F 15/1207* (2013.01); *E21B 17/042* (2013.01); *E21B 47/16* (2013.01); *G01H 1/10* (2013.01)

(58) Field of Classification Search
   CPC ......... E21B 17/07; E21B 17/073; E21B 17/04
   See application file for complete search history.

(56) References Cited

U.S. PATENT DOCUMENTS

| | | | |
|---|---|---|---|
| 6,158,529 A | 12/2000 | Dorel | |
| 6,327,539 B1 | 12/2001 | Keultjes et al. | |
| 6,808,455 B1 * | 10/2004 | Solorenko | F16D 3/12 464/20 |
| 7,036,612 B1 | 5/2006 | Raymond et al. | |
| 7,219,752 B2 | 5/2007 | Wassell et al. | |
| 7,779,933 B2 * | 8/2010 | Sihler | E21B 7/064 175/61 |

(Continued)

FOREIGN PATENT DOCUMENTS

WO    20160007689 A1    1/2016

OTHER PUBLICATIONS

Hohl, et al.; "Prediction and Mitigation of Torsional Vibrations in Drilling Systems"; IADC/SPE-178874-MS; Mar. 2016, IADC/SPE Drilling Conference and Exhibition; 15 pages.

(Continued)

*Primary Examiner* — Shane Bomar
(74) *Attorney, Agent, or Firm* — Cantor Colburn LLP

(57) ABSTRACT

Methods and systems for damping torsional oscillations of downhole systems are described. The systems include a downhole string, a bit support assembly configured to support and receive a disintegration device, wherein the disintegration device is disposed on an end of the downhole string and mounted to the bit support assembly, and a damping system configured at least one of on and in the bit support assembly, the damping system comprising at least one damper element arranged in contact with a portion of the bit support assembly.

20 Claims, 18 Drawing Sheets

(56) References Cited

U.S. PATENT DOCUMENTS

| | | |
|---|---|---|
| 8,214,188 B2 | 7/2012 | Bailey et al. |
| 8,453,764 B2 | 6/2013 | Turner et al. |
| 8,798,978 B2 | 8/2014 | Ertas et al. |
| 8,950,512 B2 | 2/2015 | Nessjoen et al. |
| 8,977,523 B2 | 3/2015 | Ertas et al. |
| 9,004,195 B2 | 4/2015 | Regener et al. |
| 9,109,410 B2 | 8/2015 | Swietlik et al. |
| 9,249,632 B2 * | 2/2016 | Lakkashetti ........ E21B 17/1014 |
| 9,382,761 B2 | 7/2016 | Huang et al. |
| 9,458,679 B2 | 10/2016 | Turner et al. |
| 9,476,261 B2 | 10/2016 | Venugopal et al. |
| 9,581,008 B2 | 2/2017 | Kyllingstad |
| 10,782,197 B2 | 9/2020 | Wu et al. |
| 2004/0238219 A1 | 12/2004 | Nichols et al. |
| 2005/0145417 A1 * | 7/2005 | Radford .................... E21B 7/00 175/57 |
| 2006/0124354 A1 | 6/2006 | Witte |
| 2010/0139977 A1 | 6/2010 | Watkins et al. |
| 2011/0077924 A1 | 5/2011 | Ertas et al. |
| 2011/0120772 A1 * | 5/2011 | McLoughlin ........... E21B 17/07 175/56 |
| 2011/0245980 A1 | 10/2011 | Nessjoen et al. |
| 2012/0130693 A1 | 5/2012 | Ertas et al. |
| 2012/0228028 A1 | 9/2012 | Turner et al. |
| 2014/0284105 A1 | 9/2014 | Veltman |
| 2014/0318865 A1 | 10/2014 | Doris |
| 2014/0323231 A1 | 10/2014 | Perry |
| 2015/0053484 A1 | 2/2015 | Meister et al. |
| 2015/0083493 A1 | 3/2015 | Wassell |
| 2015/0122547 A1 | 5/2015 | Hohl et al. |
| 2016/0138382 A1 | 5/2016 | Badkoubeh et al. |
| 2016/0281488 A1 * | 9/2016 | Dwars ..................... E21B 44/04 |
| 2016/0305197 A1 * | 10/2016 | Gajji .................. E21B 17/1078 |
| 2016/0356089 A1 | 12/2016 | Nanayakkara et al. |
| 2017/0030149 A1 | 2/2017 | Kadam et al. |
| 2017/0343046 A1 * | 11/2017 | Park ........................ E21B 17/03 |
| 2019/0284881 A1 | 9/2019 | Hohl et al. |
| 2019/0284882 A1 | 9/2019 | Peters |
| 2020/0018124 A1 | 1/2020 | Hohl |
| 2021/0010332 A1 | 1/2021 | Benedict et al. |

OTHER PUBLICATIONS

Hohl, et al; "Derivation and Experimental Validation of an Analytical Criterion for the Identification of Self-Excited Modes in Drilling System"; Journal of Sound and Vibration 342; 2015; 13 pages.

Oueslati, et al.; "New Insights Into Drilling Dynamics Through High-Frequency Vibration Measurement and Modeling"; SPE 166212; 2013; Society of Petroleum Engineers; 15 pages.

\* cited by examiner

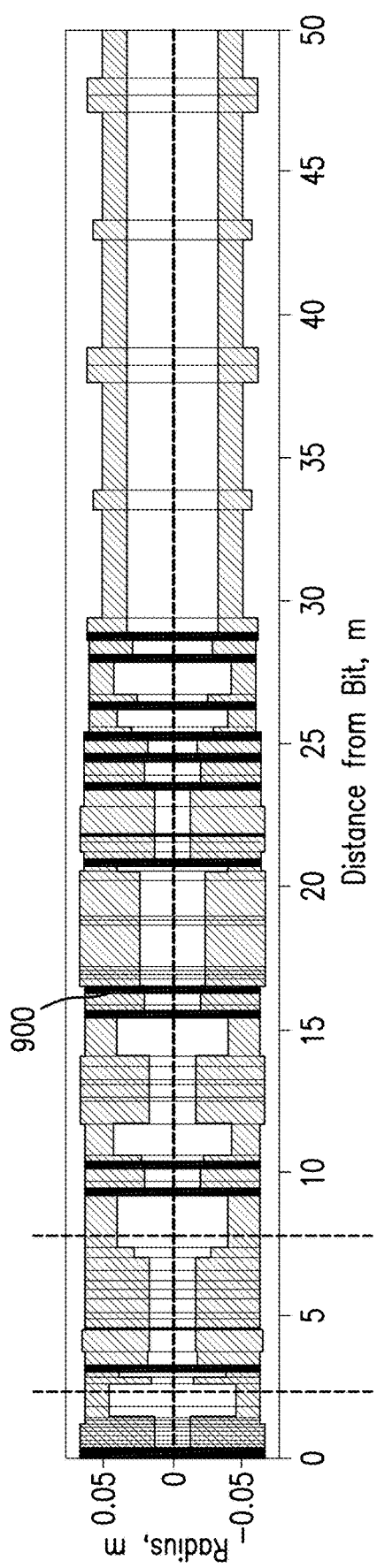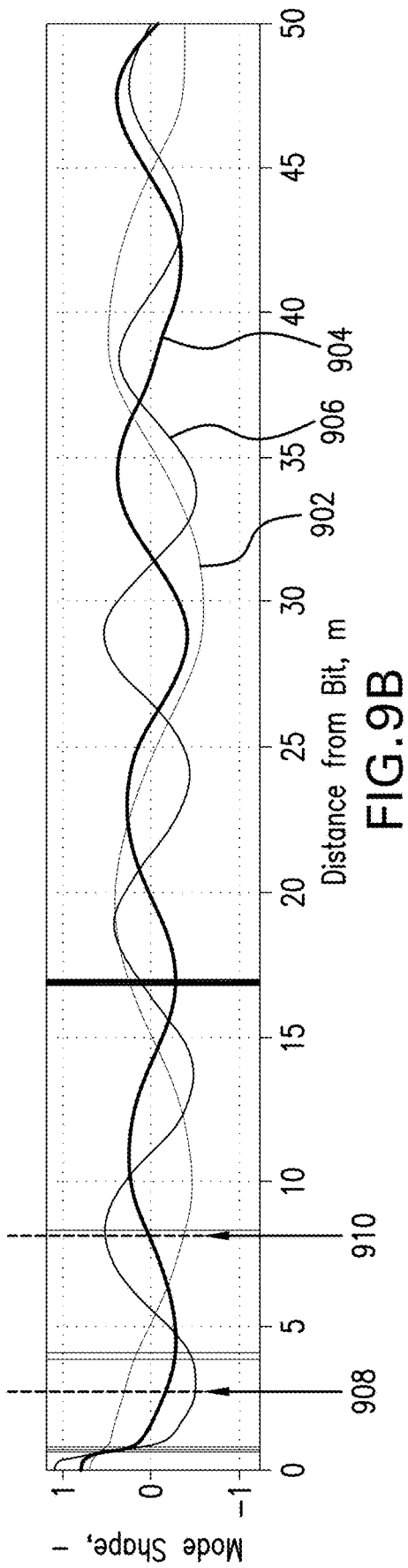
FIG.9A
FIG.9B

BIT SUPPORT ASSEMBLY INCORPORATING DAMPER FOR HIGH FREQUENCY TORSIONAL OSCILLATION

CROSS REFERENCE TO RELATED APPLICATIONS

This application is a continuation-in-part application of the legally related U.S. Ser. No. 16/353,090, filed Mar. 14, 2019, which claims the benefit of an earlier filing date from U.S. Provisional Application Ser. No. 62/643,291, filed Mar. 15, 2018, the entire disclosures of which are incorporated herein by reference.

BACKGROUND

1. Field of the Invention

The present invention generally relates to downhole operations and systems for damping vibrations of the downhole systems during operation.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to a material (e.g., a gas or fluid) contained in a formation (e.g., a compartment) located below the earth's surface. Different types of tools and instruments may be disposed in the boreholes to perform various tasks and measurements.

In operation, the downhole components may be subject to vibrations that can impact operational efficiencies. For example, severe vibrations in drill strings and bottomhole assemblies can be caused by cutting forces at the bit or mass imbalances in downhole tools such as mud motors. Impacts from such vibrations can include, but are not limited to, reduced rate of penetration, reduced quality of measurements, and excess fatigue and wear on downhole components, tools, and/or devices.

SUMMARY

Disclosed herein are systems and methods for damping oscillations, such as torsional oscillations, of downhole systems. The systems include a downhole system arranged to rotate within a borehole and a damping system configured on the downhole system. The damping system includes one or more dampers that is installed at or in a bit support assembly of the downhole system. The dampers are arranged to reduce or eliminate one or more specific vibration modes, and thus improved downhole operations and/or efficiencies may be achieved.

Further, methods and systems for damping torsional oscillations of downhole systems are described. The systems include a downhole string, a bit support assembly configured to support and receive a disintegration device, wherein the disintegration device is disposed on an end of the downhole string and mounted to the bit support assembly, and a damping system configured at least one of on and in the bit support assembly, the damping system comprising at least one damper element arranged in contact with a portion of the bit support assembly.

The methods include installing a damping system at least one of on and in a bit support assembly located on a downhole string of the downhole system, the bit support assembly having a disintegration device attached thereto. The damping system includes at least one damper element arranged in contact with a portion of the bit support assembly, wherein at least a part the damper element moves relative to the bit support assembly with a velocity that is a sum of a periodic velocity fluctuation having an amplitude and a mean velocity.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 9A is a schematic plot of a downhole system illustrating a shape of a downhole system as a function of distance-from-bit;

FIG. 9B illustrates example corresponding mode shapes of torsional vibrations that may be excited during operation of the downhole system of FIG. 9A;

DETAILED DESCRIPTION

Figure 1:
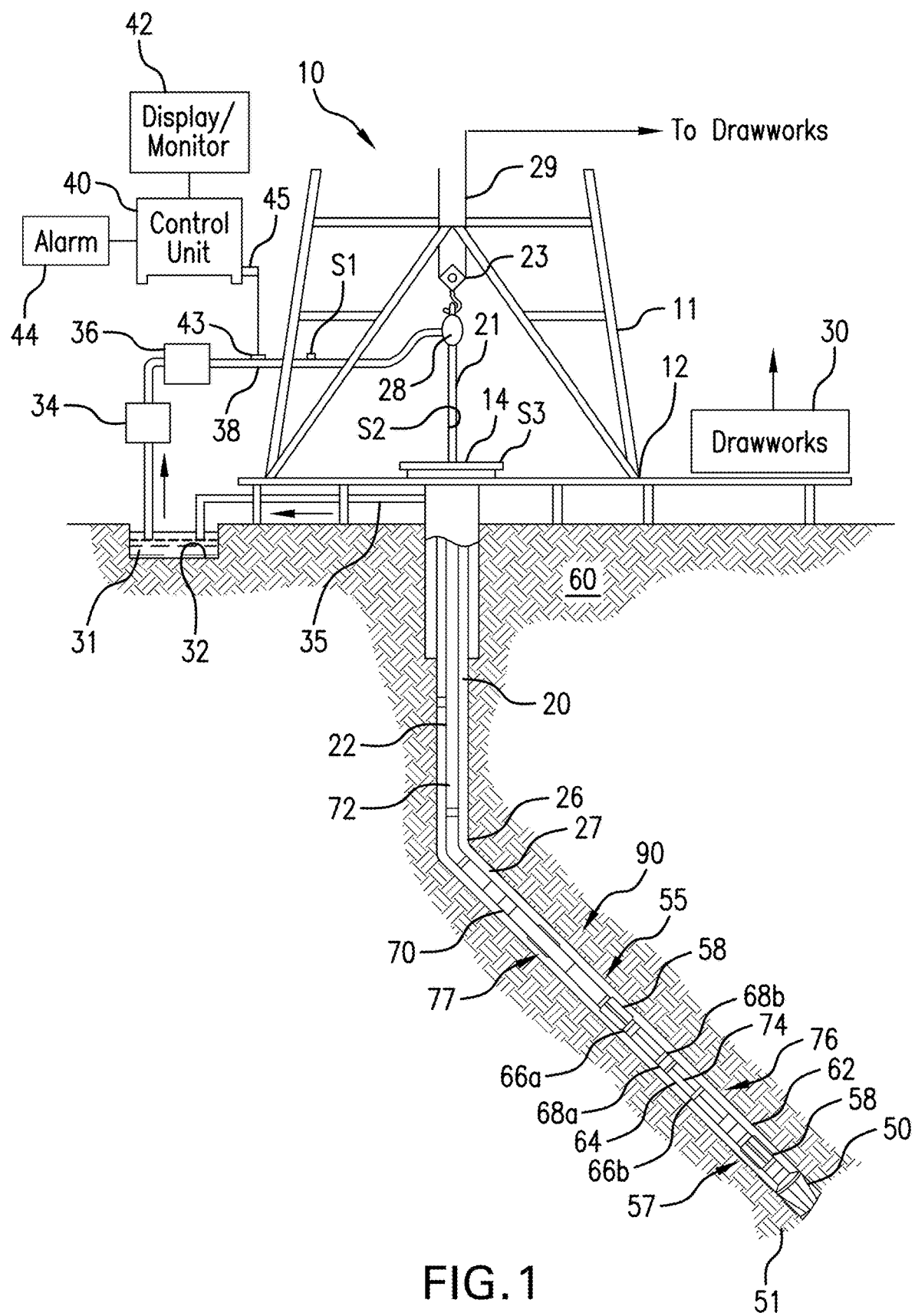
FIG. 1 is an example of a system for performing downhole operations that can employ embodiments of the present disclosure.

FIG. 1 shows a schematic diagram of a system for performing downhole operations. As shown, the system is a drilling system 10 that includes a drill string 20 having a drilling assembly 90, also referred to as a bottomhole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A disintegration device 50, such as a drill bit attached to the end of the BHA 90, disintegrates the geological formations when it is rotated to drill the borehole 26. The drill string 20 is coupled to surface equipment such as systems for lifting, rotating, and/or pushing, including, but not limited to, a drawworks 30 via a kelly joint 21, swivel 28 and line 29 through a pulley 23. In some embodiments, the surface equipment may include a top drive (not shown). During the drilling operations, the drawworks 30 is operated to control the weight on bit, which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. The drilling fluid 31 is discharged at the borehole bottom 51 through an opening in the disintegration device 50. The drilling fluid 31 circulates uphole through the annular space 27 between the drill string 20 and the borehole 26 and returns to the mud pit 32 via a return line 35. A sensor S1 in the fluid line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the borehole 26. The system may further include one or more downhole sensors 70 located on the drill string 20 and/or the BHA 90.

In some applications the disintegration device 50 is rotated by only rotating the drill pipe 22. However, in other applications, a drilling motor 55 (for example, a mud motor) disposed in the drilling assembly 90 is used to rotate the disintegration device 50 and/or to superimpose or supplement the rotation of the drill string 20. In either case, the rate of penetration (ROP) of the disintegration device 50 into the earth formation 60 for a given formation and a given drilling assembly largely depends upon the weight on bit and the drill bit rotational speed. In one aspect of the embodiment of FIG. 1, the drilling motor 55 is coupled to the disintegration device 50 via a drive shaft (not shown) disposed in a bearing assembly 57. The drilling motor 55 rotates the disintegration device 50 when the drilling fluid 31 passes through the drilling motor 55 under pressure. The bearing assembly 57 supports the radial and axial forces of the disintegration device 50, the downthrust of the drilling motor and the reactive upward loading from the applied weight on bit. Stabilizers 58 coupled to the bearing assembly 57 and/or other suitable locations act as centralizers for the drilling assembly 90 or portions thereof.

A surface control unit 40 receives signals from the downhole sensors 70 and devices via a transducer 43, such as a pressure transducer, placed in the fluid line 38 as well as from sensors S1, S2, S3, hook load sensors, RPM sensors, torque sensors, and any other sensors used in the system and processes such signals according to programmed instructions provided to the surface control unit 40. The surface control unit 40 displays desired drilling parameters and other information on a display/monitor 42 for use by an operator at the rig site to control the drilling operations. The surface control unit 40 contains a computer, memory for storing data, computer programs, models and algorithms accessible to a processor in the computer, a recorder, such as tape unit, memory unit, etc. for recording data and other peripherals. The surface control unit 40 also may include simulation models for use by the computer to processes data according to programmed instructions. The control unit responds to user commands entered through a suitable device, such as a keyboard. The surface control unit 40 is adapted to activate alarms 44 when certain unsafe or undesirable operating conditions occur.

The drilling assembly 90 also contains other sensors and devices or tools for providing a variety of measurements relating to the formation surrounding the borehole and for drilling the borehole 26 along a desired path. Such devices may include a device for measuring the formation resistivity near and/or in front of the drill bit, a gamma ray device for measuring the formation gamma ray intensity and devices for determining the inclination, azimuth and position of the drill string. A formation resistivity tool 64, made according an embodiment described herein may be coupled at any suitable location, including above a lower kick-off subassembly or steering unit 62, for estimating or determining the resistivity of the formation near or in front of the disintegration device 50 or at other suitable locations. An inclinometer 74 and a gamma ray device 76 may be suitably placed for respectively determining the inclination of the BHA and the formation gamma ray intensity. Any suitable inclinometer and gamma ray device may be utilized. In addition, an azimuth device (not shown), such as a magnetometer or a gyroscopic device, may be utilized to determine the drill string azimuth. Such devices are known in the art and therefore are not described in detail herein. In the above-described exemplary configuration, the drilling motor 55 transfers power to the disintegration device 50 via a shaft that also enables the drilling fluid to pass from the drilling motor 55 to the disintegration device 50. In an alternative embodiment of the drill string 20, the drilling motor 55 may be coupled below the resistivity measuring device 64 or at any other suitable place.

Still referring to FIG. 1, other logging-while-drilling (LWD) devices (generally denoted herein by numeral 77), such as devices for measuring formation porosity, permeability, density, rock properties, fluid properties, etc. may be placed at suitable locations in the drilling assembly 90 for providing information useful for evaluating the subsurface formations along borehole 26. Such devices may include, but are not limited to, temperature measurement tools, pressure measurement tools, borehole diameter measuring tools (e.g., a caliper), acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 and transmits such received signals and data to the appropriate downhole devices. In one aspect, a mud pulse telemetry system may be used to communicate data between the downhole sensors 70 and devices and the surface equipment during drilling operations. A transducer 43 placed in the fluid line 38 (e.g., mud supply line) detects the mud pulses responsive to the data transmitted by the downhole telemetry system 72. Transducer 43 generates electrical signals in response to the mud pressure variations and transmits such signals via a conductor 45 to the surface control unit 40. In other aspects, any other suitable telemetry system may be used for two-way data communication (e.g., downlink and uplink) between the surface and the BHA 90, including but not limited to, an acoustic telemetry system, an electro-magnetic telemetry system, an optical telemetry system, a wired pipe telemetry system which may utilize wireless couplers or repeaters in the drill string or the borehole. The wired pipe telemetry system may be made up by joining drill pipe sections, wherein each pipe section includes a data communication link, such as a wire, that runs along the pipe. The data connection between the pipe sections may be made by any suitable method, including but not limited to, hard electrical or optical connections, induction, capacitive, resonant coupling, such as electromagnetic resonant coupling, or directional coupling methods. In case a coiled-tubing is used as the drill pipe 22, the data communication link may be run along a side of the coiled-tubing.

The drilling system described thus far relates to those drilling systems that utilize a drill pipe to convey the drilling assembly 90 into the borehole 26, wherein the weight on bit is controlled from the surface, typically by controlling the operation of the drawworks. However, a large number of the current drilling systems, especially for drilling highly deviated and horizontal boreholes, utilize coiled-tubing for conveying the drilling assembly downhole. In such application a thruster is sometimes deployed in the drill string to provide the desired force on the drill bit. Also, when coiled-tubing is utilized, the tubing is not rotated by a rotary table but instead it is injected into the borehole by a suitable injector while the downhole motor, such as drilling motor 55, rotates the disintegration device 50. For offshore drilling, an offshore rig or a vessel is used to support the drilling equipment, including the drill string.

Still referring to FIG. 1, a resistivity tool 64 may be provided that includes, for example, a plurality of antennas including, for example, transmitters 66a or 66b and/or receivers 68a or 68b. Resistivity can be one formation property that is of interest in making drilling decisions. Those of skill in the art will appreciate that other formation property tools can be employed with or in place of the resistivity tool 64.

Liner drilling can be one configuration or operation used for providing a disintegration device becomes more and more attractive in the oil and gas industry as it has several advantages compared to conventional drilling. One example of such configuration is shown and described in commonly owned U.S. Pat. No. 9,004,195, entitled "Apparatus and Method for Drilling a Borehole, Setting a Liner and Cementing the Borehole During a Single Trip," which is incorporated herein by reference in its entirety. Importantly, despite a relatively low rate of penetration, the time of getting the liner to target is reduced because the liner is run in-hole while drilling the borehole simultaneously. This may be beneficial in swelling formations where a contraction of the drilled well can hinder an installation of the liner later on. Furthermore, drilling with liner in depleted and unstable reservoirs minimizes the risk that the pipe or drill string will get stuck due to hole collapse.

Although FIG. 1 is shown and described with respect to a drilling operation, those of skill in the art will appreciate that similar configurations, albeit with different components, can be used for performing different downhole operations. For example, wireline, wired pipe, liner drilling, reaming, coiled tubing, and/or other configurations can be used as known in the art. Further, production configurations can be employed for extracting and/or injecting materials from/into earth formations. Thus, the present disclosure is not to be limited to drilling operations but can be employed for any appropriate or desired downhole operation(s).

Severe vibrations in drill strings and bottomhole assemblies during drilling operations can be caused by cutting forces at the bit or mass imbalances in downhole tools such as drilling motors. Such vibrations can result in reduced rate of penetration, reduced quality of measurements made by tools of the bottomhole assembly, and can result in wear, fatigue, and/or failure of downhole components. As appreciated by those of skill in the art, different vibrations exist, such as lateral vibrations, axial vibrations, and torsional vibrations. For example, stick/slip of the whole drilling system and high-frequency torsional oscillations ("HFTO") are both types of torsional vibrations. The terms "vibration," "oscillation," as well as "fluctuation," are used with the same broad meaning of repeated and/or periodic movements or periodic deviations of a mean value, such as a mean position, a mean velocity, a mean acceleration, a mean force, and/or a mean torque. In particular, these terms are not meant to be limited to harmonic deviations, but may include all kinds of deviations, such as, but not limited to periodic, harmonic, and statistical deviations. Torsional vibrations may be excited by self-excitation mechanisms that occur due to the interaction of the drill bit or any other cutting structure such as a reamer bit and the formation. The main differentiator between stick/slip and HFTO is the frequency and typical mode shapes: For example, HFTO have a frequency that is typically above 50 Hz compared to stick/slip torsional vibrations that typically have frequencies below 1 Hz. Moreover, the excited mode shape of stick/slip is typically a first mode shape of the whole drilling system whereas the mode shape of HFTO can be of higher order and are commonly localized to smaller portions of the drilling system with comparably high amplitudes at the point of excitation that may be the bit or any other cutting structure (such as a reamer bit), or any contact between the drilling system and the formation (e.g., by a stabilizer).

Due to the high frequency of the vibrations, HFTO correspond to high acceleration and torque values along the BHA. Those skilled in the art will appreciate that for torsional movements, one of acceleration, force, and torque is always accompanied by the other two of acceleration, force, and torque. In that sense, acceleration, force, and torque are equivalent in the sense that none of these can occur without the other two. The loads of high frequency vibrations can have negative impacts on efficiency, reliability, and/or durability of electronic and mechanical parts of the BHA. Embodiments provided herein are directed to providing torsional vibration damping upon the downhole system to mitigate HFTO. In some embodiments of the present disclosure, the torsional vibration damping can be activated if a threshold of a measured property, such as a torsional vibration amplitude or frequency is achieved within the system.

In accordance with a non-limiting embodiment provided herein, a torsional vibration damping system may be based on friction dampers. For example, according to some embodiments, friction between two parts, such as two interacting bodies, in the BHA or drill string can dissipate energy and reduce the level of torsional oscillations, thus mitigating the potential damage caused by high frequency vibrations. Preferably, the energy dissipation of the friction damper is at least equal to the HFTO energy input caused by the bit-rock interaction.

Friction dampers, as provided herein, can lead to a significant energy dissipation and thus mitigation of torsional vibrations. When two components or interacting bodies are in contact with each other and move relative to each other, a friction force acts in the opposite direction of the velocity of the relative movement between the contacting surfaces of the components or interacting bodies. The friction force leads to a dissipation of energy.

Although specifically described with respect to friction dampers, dampers, damper elements, and damper systems of the present disclosure are not limited to friction. That is, as described below, other principles of damping may be implemented using dampers of different configurations. For example, damping may be generated by viscous damping, friction damping, hydraulic damping, magnetic damping (e.g., eddy current damping), piezoelectric (shunt) damping, etc. A damper element, as used herein, may be part of a damping system that is configured to dissipate energy due to relative movement between at least a part of the damper element and a downhole string. That is, relative movement of a damper element, or part thereof, enables dissipation of energy (e.g., HFTO), and thus may reduce vibration within or along a downhole string.

Figure 2:
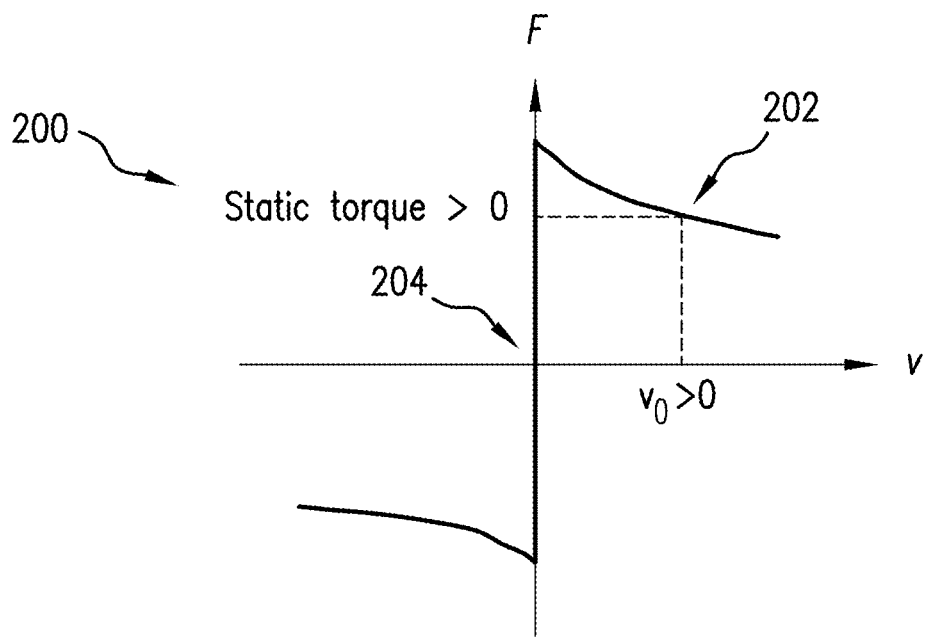
FIG. 2 is an illustrative plot of a typical curve of frictional force or torque versus relative velocity or relative rotational speed between two interacting bodies.

FIG. 2 is an illustrative plot 200 of a typical curve of the friction force or torque versus relative velocity v (e.g., or relative rotational speed) between two interacting bodies. The two interacting bodies have a contact surface and a force component $F_N$ perpendicular to the contact surface engaging the two interacting bodies. Plot 200 illustrates the dependency of friction force or torque of the two interacting bodies with a velocity-weakening behavior, such as frictional contact or a characteristic of a cutting behavior. At higher relative velocities (v>0) between the two interacting bodies, the friction force or torque has a distinct value, illustrated by point 202. Decreasing the relative velocity will lead to an increasing friction force or torque (also referred to as velocity-weakening characteristic). The friction force or torque reaches its maximum when the relative velocity is zero. The maximum friction force is also known as static friction, sticking friction, or stiction.

Generally, friction force $F_R$ depends on the normal force as described in the equation $F_R=\mu \cdot F_N$, with friction coefficient $\mu$. Generally, the friction coefficient $\mu$ is a function of velocity. Herein, the normal force can also be fluctuating corresponding to an excited vibration in the normal direction. In the case that the relative speed between two interacting bodies is zero (v=0), the static friction force $F_S$ is related to the normal force component $F_N$ by the equation $F_S=\mu_0 \cdot F_N$ with the static friction coefficient $\mu_0$. In the case that the relative speed between the two interacting bodies is not zero (v≠0), the friction coefficient is known as dynamic friction coefficient $\mu$. If the relative velocity is further decreased to negative values (i.e., if the direction the relative movement of the two interacting bodies is switched to the opposite), the friction force or torque switches to the opposite direction with a high absolute value corresponding to a step from a positive maximum to a negative minimum at point 204 in plot 200. That is, the friction force versus velocity shows a sign change at the point where the velocity changes the sign and is discontinuous at point 204 in plot 200. Velocity-weakening characteristic is a well-known effect between interacting bodies that are frictionally connected. The velocity-weakening characteristic of the contact force or torque is assumed to be a potential root cause for stick/slip. Velocity-weakening characteristic may also be achieved by utilizing dispersive fluid with a higher viscosity at lower relative velocities and a lower viscosity at higher relative velocities. If a dispersive fluid is forced through a relatively small channel, the same effect can be achieved in that the flow resistance is relatively high or low at low or high relative velocities, respectively.

Figure 8A:
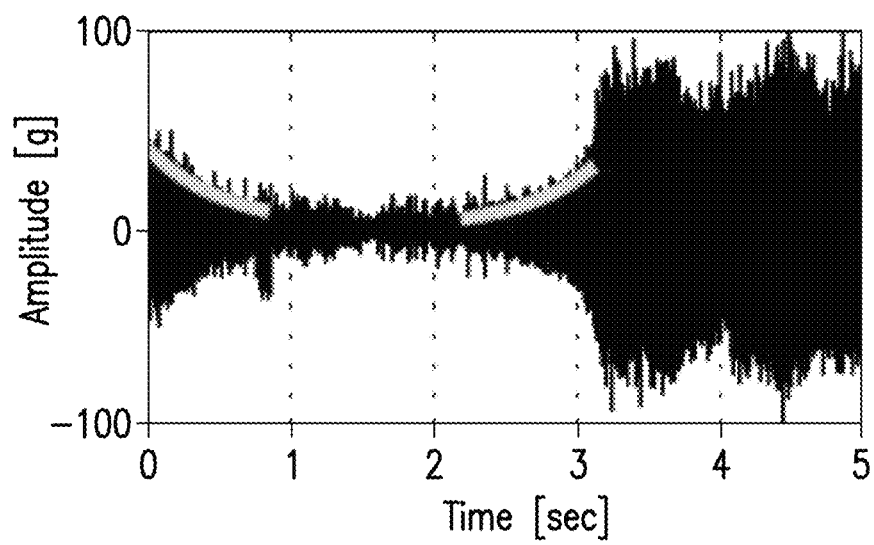
FIG. 8A is a plot of tangential acceleration measured at a bit.
Figure 8B:
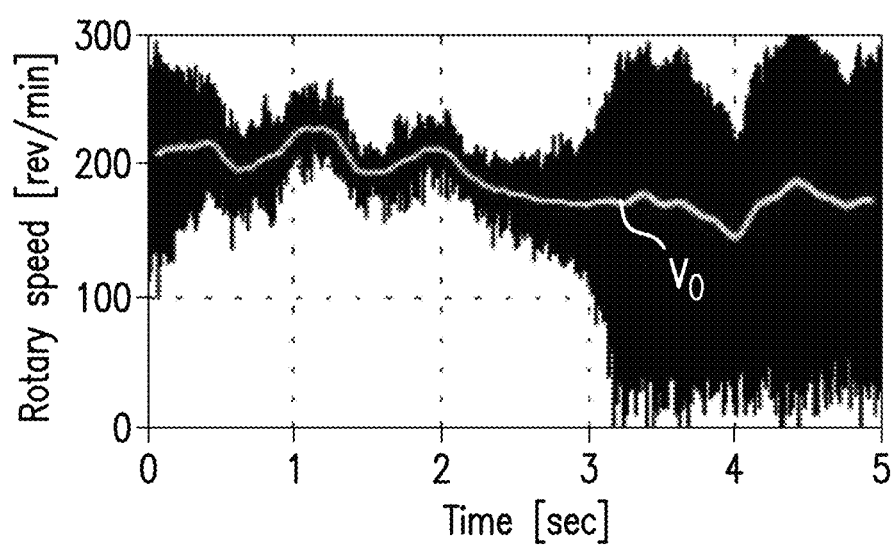
FIG. 8B is a plot corresponding to FIG. 8A illustrating rotary speed.

With reference to FIGS. 8A-8B, FIG. 8A illustrates measured torsional acceleration of a downhole system versus time. In the 5 second measurement time shown in FIG. 8A, FIG. 8A shows oscillating torsional acceleration with a mean acceleration of approximately 0 g, overlayed by oscillating torsional accelerations with a relatively low amplitude between approximately 0 s and 3 s and relatively high amplitudes up to 100 g between approximately 3 s and 5 s. FIG. 8B illustrates the corresponding rotary velocity in the same time period as in FIG. 8A. In accordance with FIG. 8A, FIG. 8B illustrates a mean velocity $v_0$ (indicated by the line $v_0$ in FIG. 8B) which is relatively constant at approximately 190 rev/min. The mean velocity is overlayed by oscillating rotary velocity variations with relatively low amplitudes between approximately 0 s and 3 s and relatively high amplitudes between approximately 3 s and 5 s in accordance with the relatively low and high acceleration amplitudes in FIG. 8A. Notably, the oscillating rotary speed does not lead to negative values of the rotary velocity, even not in the time period between approximately 3 s and 5 s when the amplitudes of the rotary speed oscillations are relatively high.

Referring again to FIG. 2, point 202 illustrates a mean velocity of the two interacting bodies that is according to the mean velocity $v_0$ in FIG. 8B. In the schematic illustration of FIG. 2, the data of FIG. 8B corresponds to a point with a velocity oscillating with relatively high frequency due to HTFO around the mean velocity $v_0$ that varies relatively slowly with time compared to the HFTO. The point illustrating the data of FIG. 8B therefore moves back and forth on the positive branch of the curve in FIG. 2 without or only rarely reaching negative velocity values. Accordingly, the corresponding friction force or torque oscillates around a positive mean friction force or mean friction torque and is generally positive or only rarely reaches negative values. As discussed further below, the point 202 illustrates where a positive mean value of the relative velocity corresponds to a static torque and the point 204 illustrates a favorable point for friction damping. It is noted that friction forces or torque between the drilling system and the borehole wall will not generate additional damping of high frequency oscillations in the system. This is because the relative velocity between the contact surfaces of the interacting bodies (e.g., a stabilizer and the borehole wall) does not have a mean velocity that is so close to zero that the HFTO lead to a sign change of the relative velocity of the two interacting bodies. Rather, the relative velocity between the two interacting bodies has a high mean value at a distance from zero that is large so that the HFTO do not lead to a sign change of the relative velocity of the two interacting bodies (e.g., illustrated by point 202 in FIG. 2).

As will be appreciated by those of skill in the art, the weakening characteristic of the contact force or torque with respect to the relative velocity as illustrated in FIG. 2, leads to an application of energy into the system for oscillating relative movements of the interacting bodies with a mean velocity $v_c$, that is high compared to the velocity of the oscillating movement. In this context, other examples of self-excitation mechanisms such as coupling between axial and torsional degree of freedom could lead to a similar characteristic.

Figure 3:
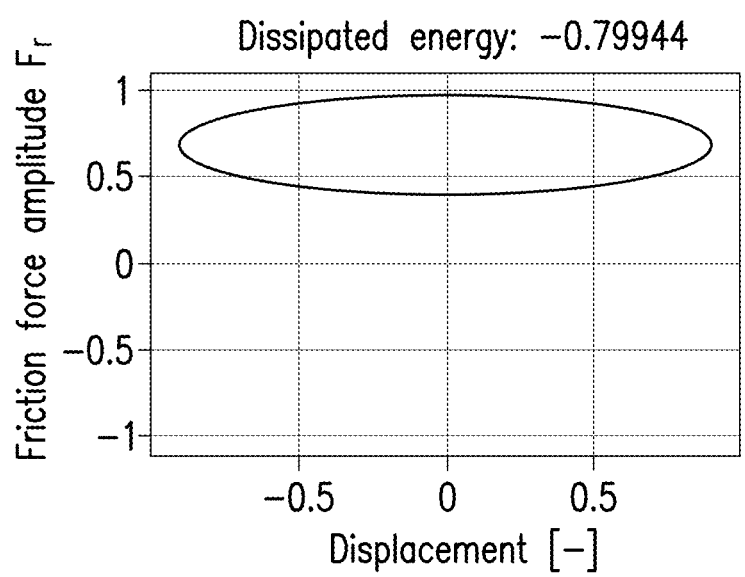
FIG. 3 is a hysteresis plot of a friction force versus displacement for a positive relative mean velocity with additional small velocity fluctuations.
Figure 4:
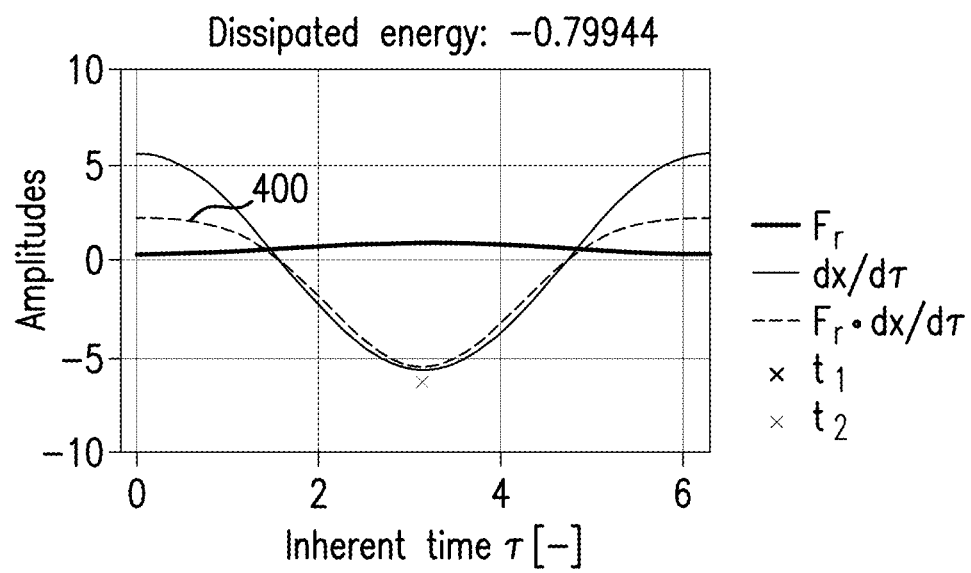
FIG. 4 is a plot of friction force, relative velocity, and a product of both versus. time for a positive relative mean velocity with additional small velocity fluctuations.

The corresponding hysteresis is depicted in FIG. 3 and the time plot for the friction force and velocity is shown in FIG. 4. FIG. 3 illustrates hysteresis of a friction force $F_r$, sometimes also referred to as a cutting force in this context, versus displacement relative to a location that is moving with a positive mean relative velocity with additional small velocity fluctuations leading to additional small displacement dx. Accordingly, FIG. 4 illustrates the friction force ($F_r$), relative velocity $$\left(\frac{dx}{d\tau}\right),$$

and a product of both (indicated by label 400 in FIG. 4) for a positive mean relative velocity with additional small velocity fluctuations leading to additional small displacement dx. Those skilled in the art, will appreciate that the area between the friction force and the velocity over time is equal to the dissipated energy (i.e., the area between the line 400 and the zero axis), which is negative in the case that is illustrated by FIG. 3 and FIG. 4. That is, in the case illustrated by FIGS. 3 and 4, energy is transferred into the oscillation from the friction via the frictional contact.

Figure 5:
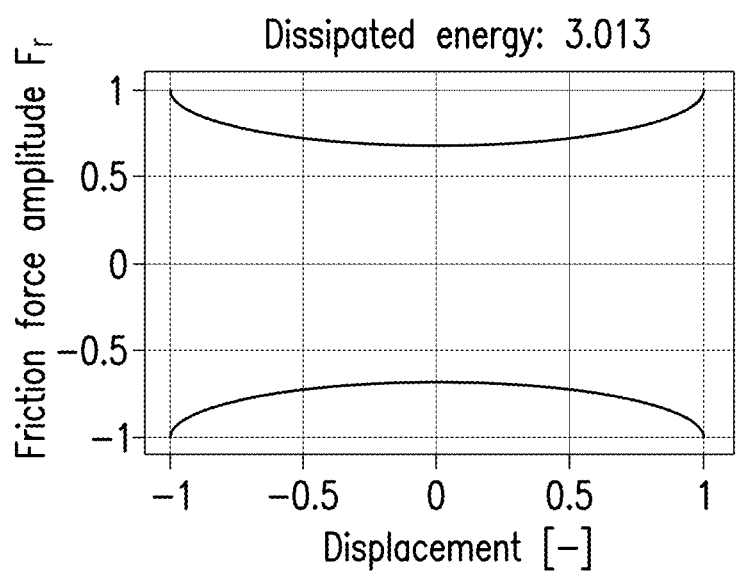
FIG. 5 is a hysteresis plot of a friction force versus displacement for a relative mean velocity of zero with additional small velocity fluctuations.
Figure 6:
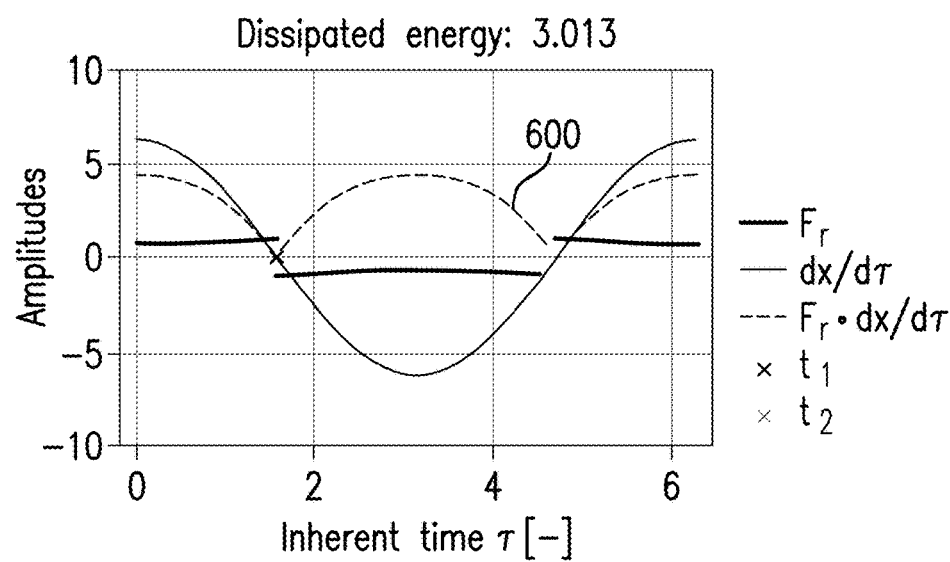
FIG. 6 is a plot of friction force, relative velocity, and a product of both for a relative mean velocity of zero with additional small velocity fluctuations.

Referring again to FIG. 2, the point 204 denotes the favorable mean velocity for friction damping of small velocity fluctuations or vibrations in addition to the mean velocity. For small fluctuations of the relative movement between the two interacting bodies, the discontinuity at point 204 in FIG. 2 with the sign change of the relative velocity of the interacting bodies also leads to an abrupt sign change of the friction force or torque. This sign change leads to a hysteresis that leads to a large amount of dissipated energy. For example, compare FIGS. 5 and 6, which are similar plots to FIGS. 3 and 4, respectively, but illustrate the case of zero mean relative velocity with additional small velocity fluctuations or vibrations. The area below the line 600 in FIG. 6 that corresponds to the product $$F_r \cdot \frac{dx}{d\tau}$$

is equal to me dissipated energy during one period and is, in this case, positive. That is, in the case illustrated by FIGS. 5 and 6, the energy is transferred from the high frequency oscillation via the frictional contact into the friction. The effect is comparably high compared to the case illustrated by FIGS. 3 and 4 and has the desired sign. It is also clear from the comparison of FIGS. 2, 5, and 6 that the dissipated energy significantly depends on the difference between maximum friction force and minimum friction force for v=0 (i.e., location 204 in FIG. 2). The higher the difference between maximum friction force and minimum friction force for v=0, the higher is the dissipated energy. While FIGS. 3-4 were generated by using a velocity weakening characteristics, such as the one shown in FIG. 2, embodiments of the present disclosure are not limited to such type of characteristics. The apparatuses and methods disclosed herein will be functional for any type of characteristic provided that the friction force or torque undergoes a step with a sign change when the relative velocity between the two interacting bodies changes its sign.

Friction dampers in accordance with some embodiments of the present disclosure will now be described. The friction dampers are installed on or in a drilling system, such as drilling system 10 shown in FIG. 1, and/or are part of drilling system 10, such as part of the bottomhole assembly 90. The friction dampers are part of friction damping systems with two interacting bodies, such as a first element and a second element having a frictional contact surface with the first element. The friction damping systems of the present disclosure are arranged so that the first element has a mean velocity that is related to the rotary speed of the drilling system to which it is installed. For example, the first element may have a similar or the same mean velocity or rotary speed as the drilling system, so that small fluctuating oscillations lead to a sign change or zero crossing of the relative velocity between the first element and second element according to point 204 in FIG. 2. It is noted that friction forces or torque between the drilling system and the borehole wall will not generate additional damping of high frequency oscillations in the system. This is because the relative velocity between the contact surfaces (e.g., a stabilizer and the borehole) does not have a zero mean value (e.g., point 202 in FIG. 2). In accordance with embodiments described herein, the static friction between the first element and the second element are set to be high enough to enable the first element to accelerate the second element (during rotation) to a mean velocity $v_0$ with the same value as the drilling system. Additional high frequency oscillations, therefore, introduce slipping between the first element (e.g., damping device) and the second element (e.g., drilling system) with positive or negative velocities according to oscillations around a position in FIG. 2 that is equal to or close to point 204 in FIG. 2. Slipping occurs if the inertial force $F_I$ exceeds the static friction force, expressed as the static friction coefficient multiplied by the normal force between the two interacting bodies: $F_I > \mu_0 \cdot F_N$. In accordance with embodiments of the present disclosure, the normal force $F_N$ (e.g. caused by the contact and surface pressure of the contact surface between the two interacting bodies) and the static friction coefficient $\mu_0$ are adjusted to achieve an optimal energy dissipation or an optimal amplitude. Further, the moment of inertia (torsional), the contact and surface pressure of the contacting surfaces, and the placement of the damper or contact surface with respect to the distance from bit may be optimized.

Figure 7:
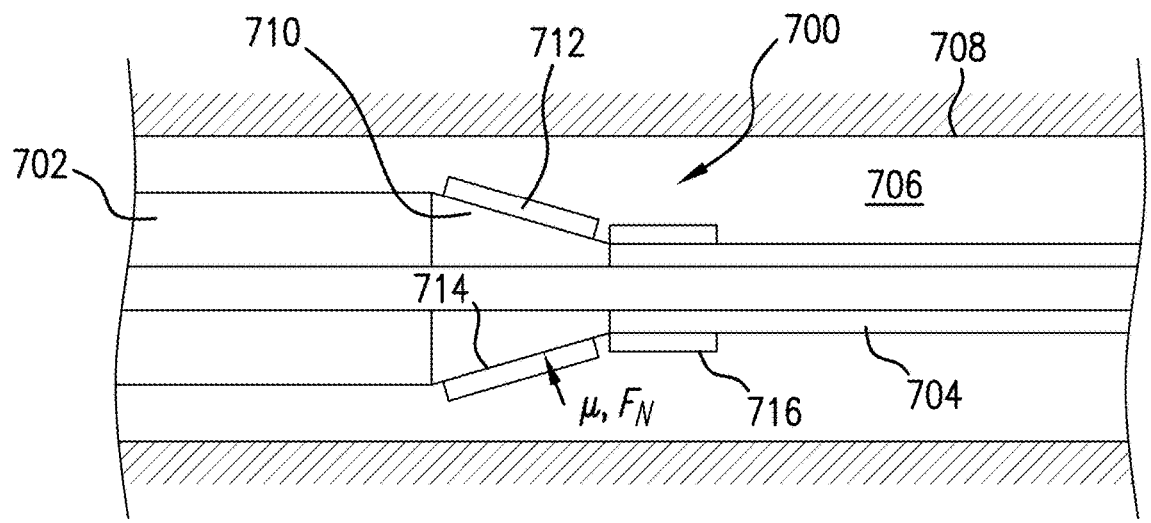
FIG. 7 is a schematic illustration of a damping system in accordance with an embodiment of the present disclosure.

For example, turning to FIG. 7, a schematic illustration of a damping system 700 in accordance with an embodiment of the present disclosure is shown. The damping system 700 is part of a downhole system 702, such as a bottomhole assembly and/or a drilling assembly. The downhole system 702 includes a string 704 that is rotated to enable a drilling operation of the downhole system 702 to form a borehole 706 within a formation 708. As discussed above, the borehole 706 is typically filled with drilling fluid, such as drilling mud. The damping system 700 includes a first element 710 that is operatively coupled, e.g. fixedly connected or an integral part of the downhole system 702, so as to ensure that the first element 710 rotates with a mean velocity that is related to, e.g. similar to or same as the mean velocity of the downhole system 702. The first element 710 is in frictional contact with a second element 712. The second element 712 is at least partially movably mounted on the downhole system 702, with a contact surface 714 located between the first element 710 and the second element 712.

In the case of frictional forces, the difference between the minimum and maximum friction force is positively dependent on the normal force and the static friction coefficient. The dissipated energy increases with friction force and the harmonic displacement, but, only in a slip phase, energy is dissipated. In a sticking phase, the relative displacement between the friction interfaces and the dissipated energy is zero. The upper amplitude limit of the sticking phase increases linearly with the normal force and the friction coefficient in the contact interface. The reason is that the reactive force in the contact interface, $J\ddot{x} \geq M_H = F_N \mu_H r$, that can be caused by the inertia J of one of the contacting bodies if it is accelerated with $\ddot{x}$ has to be higher than the torque $M_H = F_N \mu_H r$ that defines the limit between sticking and slipping. As used herein, $F_N$ is the normal force and $\mu_H$ is the effective friction coefficient and r is the effective or mean radius of the friction contact area. For complex frictional contacts parts of the interacting bodies, sticking or slipping can occur at the same time. Herein the contact pressure can be optimized to achieve an optimal damping and amplitude.

Similar mechanisms apply if the contact force is caused by a displacement and spring element. The acceleration z of the contact area can be due to an excitation of a mode and is dependent upon the corresponding mode shape, as further discussed below with respect to FIG. 9B. In case of an attached inertia mass J the acceleration $\ddot{x}$ is equal to the acceleration of the excited mode and corresponding mode shape at the attachment position as long as the contact interface is sticking.

The normal force and friction force have to be adjusted to guarantee a slipping phase in an adequate or tolerated amplitude range. A tolerated amplitude range can be defined by an amplitude that is between zero and the limits of loads that are, for example, given by design specifications of tools and components. A limit could also be given by a percentage of the expected amplitude without the damper. The dissipated energy that can be compared to the energy input, e.g., by a forced or self-excitation, is one measure to judge the efficiency of a damper. Another measure is the provided equivalent damping of the system that is proportional to the ratio of the dissipated energy in one period of a harmonic vibration to the potential energy during one period of vibration in the system. This measure is especially effective in case of self-excited systems. In the case of self-excited systems, the excitation can be approximated by a negative damping coefficient and both the equivalent damping and the negative damping can be directly compared. The damping force that is provided by the damper is nonlinear and strongly amplitude dependent.

Figure 20:
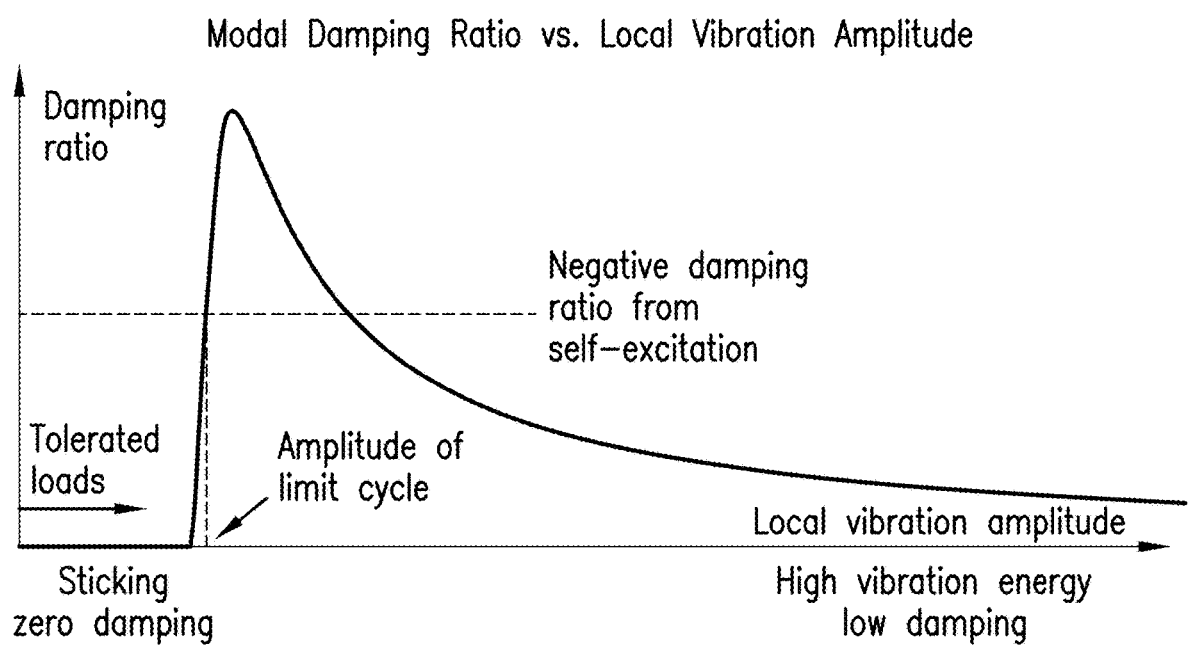
FIG. 20 is a schematic plot of a modal damping ratio versus local vibration amplitude.

As shown in FIG. 20, the damping is zero in the sticking phase (left end of plot of FIG. 20) where the relative movement between the interacting bodies is zero. If, as described above, the limit between the sticking and slipping phase is exceeded by the force that is transferred through the contact interface, a relative sliding motion is occurring that causes the energy dissipation. The damping ratio provided by the friction damping is then increasing to a maximum and afterwards declining to a minimum. The amplitude that will be occurring is dependent upon the excitation that could be described by the negative damping term. Herein, the maximum of the damping provided, as depicted in FIG. 20, has to be higher than the negative damping from the self-excitation mechanism. The amplitude that is occurring in a so-called limit cycle can be determined by the intersection of the negative damping ratio and the equivalent damping ratio that is provided by the friction damper.

The curve is dependent on different parameters. It is beneficial to have a high normal force but a sliding phase that occurs at a minimum amplitude of the bottomhole assembly. In the case of the inertia mass, this can be achieved by a high mass or by placing the contact interface at a point of high acceleration with respect to the excited mode shape. In the case of contacting interfaces, a high relative displacement in comparison to the amplitude of the mode shape at the contact point, e.g., along the axial axis of the BHA, is beneficial. Therefore, an optimal placement of the damping device according to a high amplitude or relative amplitude is important. This can be achieved by using simulation results, as discussed below. The normal force and the friction coefficient can be used to shift the curve to lower or higher amplitudes but does not have a high influence on the damping maximum. If more than one friction damper is implemented, this would lead to a superposition of similar curves shown in FIG. 20. If the normal force and friction coefficients are adjusted to achieve the maximum at the same amplitude, this is beneficial for the overall damping that is achieved. Further, slightly shifted damping curves would lead to a resulting curve that could be broader with respect to the amplitude that could be beneficial to account for impacts that could shift the amplitude to the right of the maximum. In this case, the amplitude would increase to a very high value in case of self-excited systems as indicated by the negative damping. In this case, the amplitude needs to be shifted again to the left side of the maximum, e.g., by going off bottom or reducing the rotary speed of the system to lower levels. The amplitude in this context approximately linearly scaled by the mean rotary speed as indicated and discussed with respect to FIG. 8B.

Referring again to FIG. 7, the string 704, and thus the downhole system 702, rotates with a rotary speed $$\frac{d\varphi}{d\tau},$$

that may be measured in revolutions per minute (RPM). The second element 712 is mounted onto the first element 710. A normal force $F_N$ between the first element 710 and the second element 712 can be selected or adjusted through application and use of an adjusting element 716. The adjusting element 716 may be adjustable, for example via a thread, an actuator, a piezoelectric actuator, a hydraulic actuator, and/or a spring element, to apply force that has a component in the direction perpendicular to the contact surface 714 between the first element 710 and the second element 712. For example, as shown in FIG. 7, the adjusting element 716 may apply a force in axial direction of downhole system 702, that translates into a force component $F_N$ that is perpendicular to the contact surface 714 of first element 710 and second element 712 due to the non-zero angle between the axis of the downhole system 702 and the contact surface 714 of first element 710 and second element 712. In some configurations, an angle between the system 712 and the inertia mass element is selected or defined to allow a sliding motion and avoid self-locking.

The second element 712 has a moment of inertia J. When HFTO occurs during operation of the downhole system 702, both the downhole system 702 and the second element 712 are accelerated according to a mode shape (e.g., defines the amplitude distribution along the dimensions of the drilling system, drill string, and/or BHA) and the amplitude of the mode (e.g., scales the amplitude of the mode shape). Exemplary results of such operation are shown in FIGS. 8A and 8B. FIG. 8A is a plot of tangential acceleration measured at a bit and FIG. 8B is a corresponding rotary speed.

Due to the tangential acceleration and the inertia of the second element 712, relative inertial forces occur between the second element 712 and the first element 710. If these inertial forces exceed a threshold between sticking and slipping, i.e., if these inertial forces exceed static friction force between the first element 710 and the second element 710, a relative movement between the elements 710, 712 will occur that leads to energy dissipation. In such arrangements, the accelerations, the static and/or dynamic friction coefficient, and the normal force determine the amount of dissipated energy. For example, the moment of inertia J of the second element 712 determines the relative force that has to be transferred between the first element 710 and the second element 712. High accelerations and moments of inertia increase the tendency for slipping at the contact surface 714 and thus lead to a higher energy dissipation and equivalent damping ratio provided by the damper.

Due to the energy dissipation that is caused by frictional movement between the first element 710 and the second element 712, heat and wear will be generated on the first element 710 and/or the second element 712. To keep the wear below an acceptable level, materials can be used for the first and/or second elements 710, 712 that can withstand the wear. For example, diamonds or polycrystalline diamond compacts can be used for, at least, a portion of the first and/or second elements 710, 712. Alternatively, or in addition, coatings may help to reduce the wear due to the friction between the first and second elements 710, 712. The heat can lead to high temperatures and may impact reliability or durability of the first element 710, the second element 712, and/or other parts of the downhole system 702. The first element 710 and/or the second element 712 may be made of a material with high thermal conductivity or high heat capacity and/or may be in contact with a material with high thermal conductivity or heat capacity.

Such materials with high thermal conductivity include, but are not limited to, metals or compounds including metal, such as copper, silver, gold, aluminum, molybdenum, tungsten or thermal grease comprising fat, grease, oil, epoxies, silicones, urethanes, and acrylates, and optionally fillers such as diamond, metal, or chemical compounds including metal (e.g., silver, aluminum in aluminum nitride, boron in boron nitride, zinc in zinc oxide), or silicon or chemical compounds including silicon (e.g., silicon carbide). In addition or alternatively, one or both of the first element 710 and the second element 712 may be in contact with a fluid, such as the drilling fluid, that is configured to remove heat from the first element 710 and/or the second element 712 in order to cool the respective element 710, 712. Further, an amplitude limiting element (not shown), such as a key, a recess, or a spring element may be employed and configured to limit the energy dissipation to an acceptable limit that reduces the wear.

When arranging the damping system 700, a high normal force and/or static or dynamic friction coefficient will prevent a relative slipping motion between the first element 710 and the second element 712, and in such situations, no energy will be dissipated. In contrast, a low normal force and/or static or dynamic friction coefficient can lead to a low friction force, and slipping will occur but the dissipated energy is low. In addition, low normal force and/or static or dynamic friction coefficient may lead to the case that the friction at the outer surface of the second element 712, e.g., between the second element 712 and the formation 708, is higher than the friction between first element 710 and second element 712, thus leading to the situation that the relative velocity between first element 710 and second element 712 is not equal to or close to zero but is in the range of the mean velocity between downhole system 702 and formation 708. As such, the normal force and the static or dynamic friction coefficient and the placement of the damper element with respect to the exited mode and mode shape may be adjusted (e.g., by using the adjusting element 716) to achieve an optimized value for energy dissipation.

This can be done by adjusting the normal force $F_N$, the static friction coefficient $\mu_0$, the dynamic friction coefficient $\mu$, the placement of the damper element with respect to the excited mode shape, or combinations thereof. The normal force $F_N$ can be adjusted by positioning the adjusting element 716 and/or by actuators that generate a force on one of the first and second elements with a component perpendicular to the contact surface of first and second element, by adjusting the pressure regime around first and second element, or by increasing or decreasing an area where a pressure is acting on. For example, by increasing the outer pressure that acts on the second element, such as the mud pressure, the normal force $F_N$ will be increased as well. Adjusting the pressure of the mud downhole may be achieved by adjusting the mud pumps (e.g., mud pumps 34 shown in FIG. 1) on surface or other equipment on surface or downhole that influences the mud pressure, such as bypasses, valves, desurgers. The normal force can be adjusted to be harmonic with the same frequency as the natural frequency of the excited mode shape and thus have low normal force values for low acceleration of the inertia mass and high normal force values for low accelerations of the inertia mass and therefor allow sliding motion for low acceleration values.

The normal force $F_N$ may also be adjusted by a biasing element (not shown), such as a spring element, that applies force on the second element 712, e.g. a force in an axial direction away from or toward the first element 710. Adjusting the normal force $F_N$ may also be done in a controlled way based on an input received from a sensor. For example, a suitable sensor (not shown) may provide one or more parameter values to a controller (not shown), the parameter value(s) being related to the relative movement of the first element 710 and the second element 712 or the temperature of one or both of the first element 710 and the second element 712. Based on the parameter value(s), the controller may provide instruction to increase or decrease the normal force $F_N$. For example, if the temperature of one or both of the first element 710 and the second element 712 exceeds a threshold temperature, the controller may provide instruction to decrease the normal force $F_N$ to prevent damage to one or both of the first element 710 and the second element 712 due to high temperatures. Similarly, for example, if a distance, velocity, or acceleration of the second element 712 relative to the first element 710 exceeds a threshold, the controller may provide instructions to increase or decrease the normal force $F_N$ to ensure optimal energy dissipation. By monitoring the parameter value, the normal force $F_N$ may be controlled to achieve desired results over a time period. For instance, the normal force $F_N$ may be controlled to provide optimal energy dissipation while keeping the temperature of one or both of the first element 710 and the second element 712 below a threshold for a drilling run or a portion thereof.

Additionally, the static or dynamic friction coefficient can be adjusted by utilizing different materials, for example, without limitation, material with different stiffness, different roughness, and/or different lubrication. For example, a surface with higher roughness often increases the friction coefficient. Thus, the friction coefficient can be adjusted by choosing a material with an appropriate friction coefficient for at least one of the first and the second element or a part of at least one of the first and second element. The material of first and/or second element may also have an effect on the wear of the first and second element. To keep the wear low of the first and second element it is beneficial to choose a material that can withstand the friction that is created between the first and second elements. The inertia, the friction coefficient, and the expected acceleration amplitudes (e.g., as a function of mode shape and eigenfrequency) of the second element 712 are parameters that determine the dissipated energy and also need to be optimized. The critical mode shapes and acceleration amplitudes can be determined from measurements or calculations or based on other known methods as will be appreciated by those of skill in the art. Examples are a finite element analysis or the transfer matrix method or finite differences method and based on this a modal analysis or analytical models. The placement of the friction damper is optimal where a high relative displacement or acceleration is expected.

Turning now to FIGS. 9A and 9B, an example of a downhole system 900 and corresponding modes are shown. FIG. 9A is a schematic plot of a downhole system illustrating a shape of a downhole system as a function of distance-from-bit, and FIG. 9B illustrates example corresponding mode shapes of torsional oscillations that may be excited during operation of the downhole system of FIG. 9A. The illustrations of FIGS. 9A and 9B demonstrate the potential location and placement of one or more elements of a damping system onto the downhole system 900.

As illustratively shown in FIG. 9A, the downhole system 900 has various components with different diameters (along with differing masses, densities, configurations, etc.) and thus during rotation of the downhole system 900, different components may cause various modes to be generated. The illustrative modes indicate where the highest amplitudes will exist that may require damping by application of a damping system. For example, as shown in FIG. 9B, the mode shape 902 of a first torsional oscillation, the mode shape 904 of a second torsional oscillation, and the mode shape 906 of a third torsional oscillation of the downhole system 900 are shown. Based on the knowledge of mode shapes 902, 904, 906, the position of the first elements of damping system can be optimized. Where an amplitude of a mode shape 902, 904, 906 is maximum (peaks), damping may be required and/or achieved. Accordingly, illustratively shown are two potential locations for attachment or installation of a damping system of the present disclosure.

For example, a first damping location 908 is close to the bit of downhole system 900 and mainly damps the first and third torsional oscillations (corresponding to mode shapes 902, 906) and provides some damping with respect to the second torsional oscillation (corresponding to mode shape 904). That is, the first damping location 908 to be approximately at a peak of the third torsional oscillation (corresponding to mode shape 906), close to peak of the first torsional oscillation mode shape 902, and about half-way to peak with respect to the second torsional oscillation mode shape 904.

A second damping location 910 is arranged to again mainly provide damping of the third torsional oscillation mode shape 906 and provide some damping with respect to the first torsional oscillation mode shape 902. However, in the second damping location 910, no damping of the second torsional oscillation mode shape 904 will occur because the second torsional oscillation mode shape 904 is nearly zero at the second damping location 910.

Although only two locations are shown in FIGS. 9A and 9B for placement of damping systems of the present disclosure, embodiments are not to be so limited. For example, any number and any placement of damping systems may be installed along a downhole system to provide torsional vibration damping upon the downhole system. An example of a preferred installation location for a damper is where one or more of the expected mode shapes show high amplitudes.

Due to the high amplitudes at the drill bit, for example, one good location of a damper is close to or even within the drill bit. Further, the first and second elements are not limited to a single body, but can take any number of various configurations to achieve desired damping. That is, multiple body (multi-body) first or second elements (e.g., friction damping devices) with each body having the same or different normal forces, friction coefficients, and moments of inertia can be employed. Such multiple-body element arrangements can be used, for example, if it is uncertain which mode shape and corresponding acceleration is expected at a given position along a downhole system.

For example, two or more element bodies that can achieve different relative slipping motion between each other to dissipate energy may be used. The multiple bodies of the first element can be selected and assembled with different static or dynamic friction coefficients, angles between the contact surfaces, and/or may have other mechanisms to influence the amount of friction and/or the transition between sticking and slipping. Several amplitude levels, excited mode shapes, and/or natural frequencies can be damped with such configurations.

Figure 10:
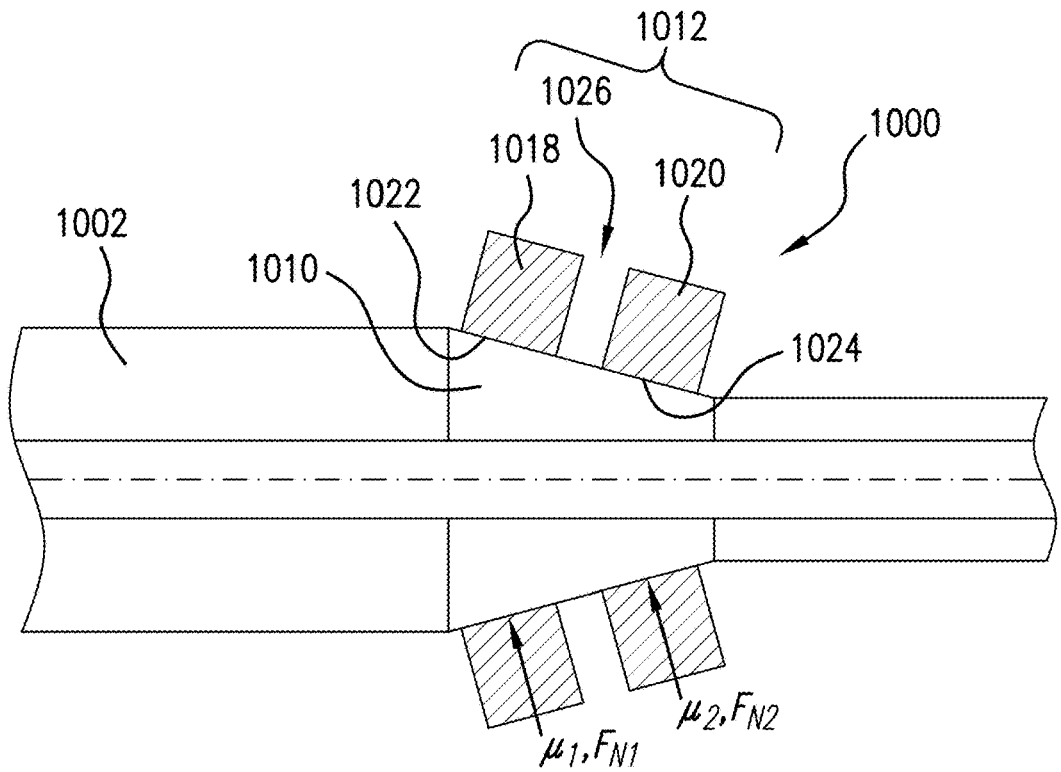
FIG. 10 is a schematic illustration of a damping system in accordance with an embodiment of the present disclosure.

For example, turning to FIG. 10, a schematic illustration of a damping system 1000 in accordance with an embodiment of the present disclosure is shown. The damping system 1000 can operate similar to that shown and described above with respect to FIG. 7. The damping system 1000 includes first element 1010 and second elements 1012. However, in this embodiment, the second element 1012 that is mounted to the first element 1010 of a downhole system 1002 is formed from a first body 1018 and a second body 1020. The first body 1018 has a first contact surface 1022 between the first body 1018 and the first element 1010 and the second body 1020 has a second contact surface 1024 between the second body 1020 and the first element 1010. As shown, the first body 1018 is separated from the second body 1020 by a gap 1026. The gap 1026 is provided to prevent interaction between the first body 1018 and the second body 1020 such that they can operate (e.g., move) independent of each other or do not directly interact with each other. In this embodiment, the first body 1018 has a first static or dynamic friction coefficient $\mu_1$ and a first force $F_{N1}$ that is normal to the first contact surface 1022, whereas the second body 1020 has a second static or dynamic friction coefficient $\mu_2$ and a second force $F_{N2}$ that is normal to the second contact surface 1024. Further, the first body 1018 can have a first moment of inertia $J_1$ and the second body 1020 can have a second moment of inertia $J_2$. In some embodiments, at least one of the first static or dynamic friction coefficient $\mu_1$, the first normal force $F_{N1}$, and the first moment of inertia $J_1$ are selected to be different than the second static or dynamic friction coefficient $\mu_2$, the second normal force $F_{N2}$, and the second moment of inertia $J_1$, respectively. Thus, the damping system 1000 can be configured to account for multiple different mode shapes at a substantially single location along the downhole system 1002.

Figure 11:
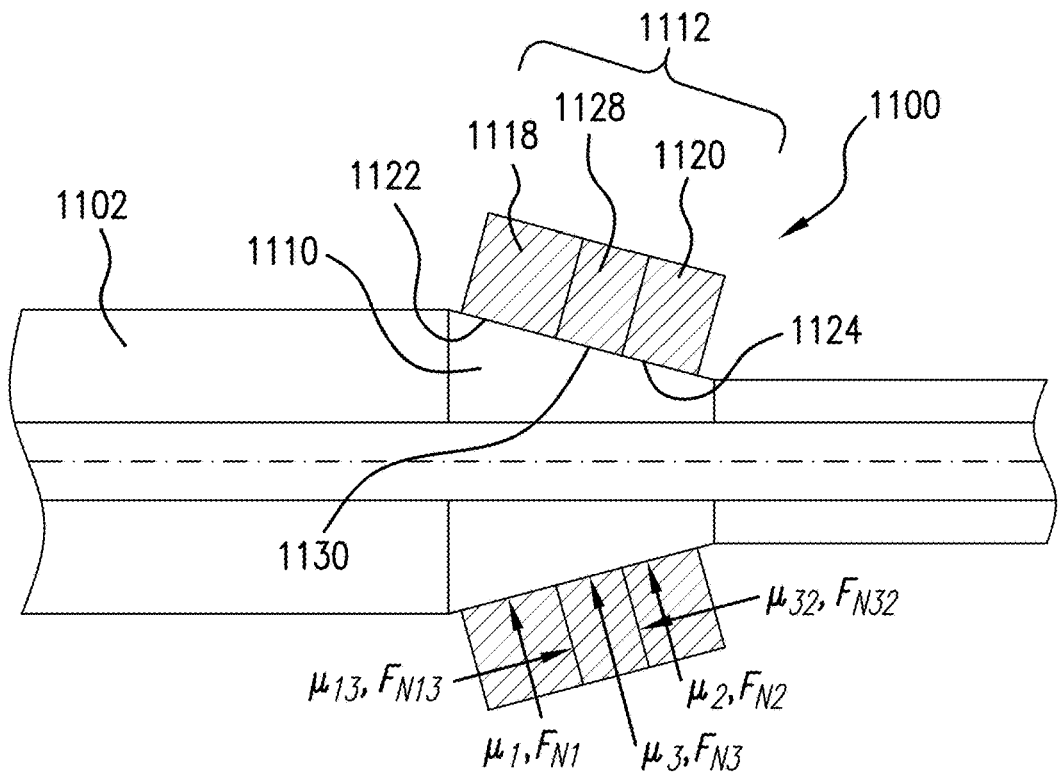
FIG. 11 is a schematic illustration of a damping system in accordance with an embodiment of the present disclosure.

Turning now to FIG. 11, a schematic illustration of a damping system 1100 in accordance with an embodiment of the present disclosure is shown. The damping system 1100 can operate similar to that shown and described above. However, in this embodiment, a second element 1112 that is mounted to a first element 1110 of a downhole system 1102 is formed from a first body 1118, a second body 1120, and a third body 1128. The first body 1118 has a first contact surface 1122 between the first body 1118 and the first element 1110, the second body 1120 has a second contact surface 1124 between the second body 1120 and the first element 1110, and the third body 1128 has a third contact surface 1130 between the third body 1128 and the first element 1110. As shown, the third body 1128 is located between the first body 1118 and the second body 1020. In this embodiment, the three bodies 1118, 1120, 1128 are in contact with each other and thus can have normal forces and static or dynamic friction coefficients therebetween.

The contact between the three bodies 1118, 1120, 1128 may be established, maintained, or supported by elastic connection elements such as spring elements between two or more of the bodies 1118, 1120, 1128. In addition, or alternatively, the first body 1118 may have a first static or dynamic friction coefficient $\mu_1$ and a first force $F_{N1}$ at the first contact surface 1122, the second body 1120 may have a second static or dynamic friction coefficient $\mu_2$ and a second force $F_{N2}$ at the second contact surface 1124, and the third body 1128 may have a third static or dynamic friction coefficient $\mu_3$ and a third force $F_{N3}$ at the third contact surface 1130.

In addition, or alternatively, the first body 1118 and the third body 1128 may have a fourth force $F_{N13}$ and a fourth static or dynamic friction coefficient $\mu_{13}$ between each other at a contact surface between the first body 1118 and the third body 1128. Similarly, the third body 1128 and the second body 1120 may have a fifth force $F_{N32}$ and a fifth static or dynamic friction coefficient $\mu_{32}$ between each other at a contact surface between the third body 1128 and the second body 1120.

Further, the first body 1118 can have a first moment of inertia $J_1$, the second body 1120 can have a second moment of inertia $J_2$, and the third body 1128 can have a third moment of inertia $J_3$. In some embodiments, the static or dynamic friction coefficients $\mu_1$, $\mu_2$, $\mu_3$, $\mu_{13}$, $\mu_{32}$, the forces $F_{N1}$, $F_{N2}$, $F_{N3}$, $F_{13}$, $F_{32}$, and the moment of inertia $J_1$, $J_2$, $J_3$ can be selected to be different than each other so that the product $\mu_i \cdot F_i$ (with i=1, 2, 3, 13, 32) are different for at least a subrange of the relative velocities of first element 1110, first body 1118, second body 1120, and third body 1128. Moreover, the static or dynamic friction coefficients and normal forces between adjacent bodies can be selected to achieve different damping effects.

Although shown and described with respect to a limited number of embodiments and specific shapes, relative sizes, and numbers of elements, those of skill in the art will appreciate that the damping systems of the present disclosure can take any configuration. For example, the shapes, sizes, geometries, radial placements, contact surfaces, number of bodies, etc. can be selected to achieve a desired damping effect. While in the arrangement that is shown in FIG. 11, the first body 1118 and the second body 1120 are coupled to each other by the frictional contact to the third body 1128, such arrangement and description is not to be limiting. The coupling between the first body 1118 and the second body 1120 may also be created by a hydraulic, electric, or mechanical coupling means or mechanism. For example, a mechanical coupling means between the first body 1118 and the second body 1120 may be created by a rigid or elastic connection of first body 1118 and the second body 1120.

Figure 12:
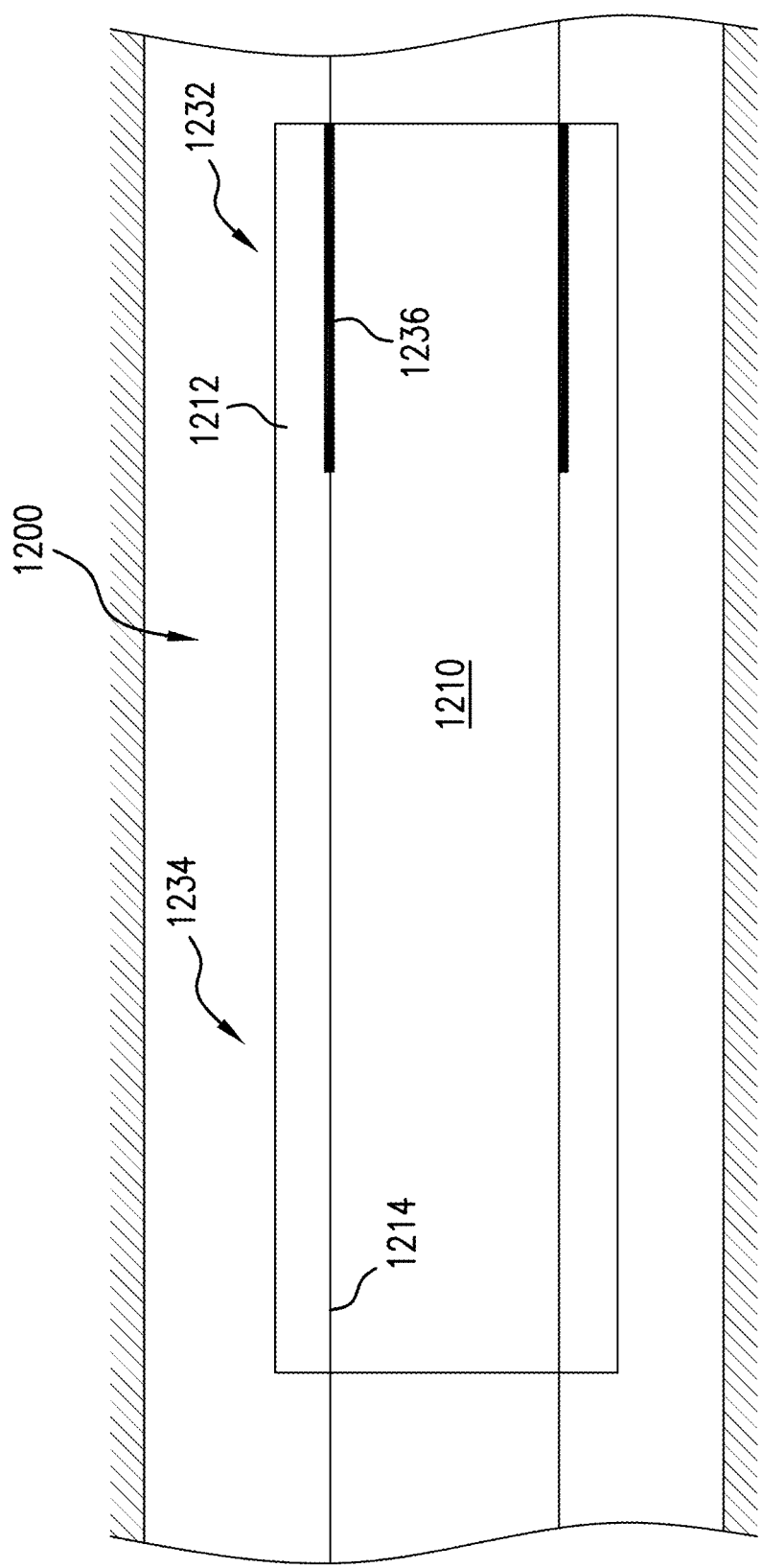
FIG. 12 is a schematic illustration of a damping system in accordance with an embodiment of the present disclosure.

Turning now to FIG. 12, a schematic illustration of a damping system 1200 in accordance with an embodiment of the present disclosure is shown. The damping system 1200 can operate similar to that shown and described above. However, in this embodiment, a second element 1212 of the damping system 1200 is partially fixedly attached to or connected to a first element 1210. For example, as shown in this embodiment, the second element 1212 has a fixed portion 1232 (or end) and a movable portion 1234 (or end). The fixed portion 1232 is fixed to the first element 1210 along a fixed connection 1236 and the movable portion 1234 is in frictional contact with the first element 1210 across the contact surface 1214 (similar to the first element 1010 in frictional contact with the second element 1012 described with respect to FIG. 10).

The movable portion 1234 can have any desired length that may be related to the mode shapes as shown in FIG. 9B. For example, in some embodiments, the movable portion may be longer than a tenth of the distance between the maximum and the minimum of any of the mode shapes that may have been calculated for a particular drilling assembly. In another example, in some embodiments, the movable portion may be longer than a quarter of the distance between the maximum and the minimum of any of the mode shapes that may have been calculated for a particular drilling assembly. In another example, in some embodiments, the movable portion may be longer than a half of the distance between the maximum and the minimum of any of the mode shapes that may have been calculated for a particular drilling assembly. In another example, in some embodiments, the movable portion may be longer than the distance between the maximum and the minimum of any of the mode shapes that may have been calculated for a particular drilling assembly.

As such, even though it may not be known where the exact location of mode maxima or minima is during a downhole deployment, it is assured that the second element 1212 is in frictional contact with the first element 1210 at a position of maximum amplitude to achieve optimized damping. Although shown with a specific arrangement, those of skill in the art will appreciate that other arrangements of partially fixed first elements are possible without departing from the scope of the present disclosure. For example, in one non-limiting embodiment, the fixed portion can be in a more central part of the first element such that the first element has two movable portions (e.g., at opposite ends of the first element). As can be seen in FIG. 12, the movable portion 1234 of the second element 1212 is rather elongated and may cover a portion of the mode shapes (such as mode shapes 902, 904, 906 in FIG. 9B) that correspond to the length of the movable portion 1234 of the second element 1212. An elongated second element 1212 in frictional contact with the first element 1210 may have advantages compared to shorter second elements because shorter second elements may be located in an undesired portion of the mode shapes such as in a damping location 910 where the second mode shape 904 is small or even zero as explained above with respect to FIG. 9B. Utilizing an elongated second element 1212 may ensure that at least a portion of the second element is at a distance from locations where one or more of the mode shapes are zero or at least close to zero. FIGS. 13-19 and 21-22 show more varieties of elongated second elements in frictional contact with first elements. In some embodiments, the elongated second elements may be elastic so that the movable portion 1234 is able move relative to the first element 1210 while the fixed portion 1232 is stationary relative to first element 1210. In some embodiments, the second element 1212 may have multiple contact points at multiple locations of the first element 1210.

In the above described embodiments, and in damping systems in accordance with the present disclosure, the first elements are temporarily fixed to the second elements due to a friction contact. However, as vibrations of the downhole systems increase, and exceed a threshold, e.g., when a force of inertia exceeds the static friction force, the first elements (or portions thereof) move relative to the second elements, thus providing the damping. That is, when HFTO increase above predetermined thresholds (e.g., thresholds of amplitude, distance, velocity, and/or acceleration) within the downhole systems, the damping systems will automatically operate, and thus embodiments provided herein include passive damping systems. For example, embodiments include passive damping systems automatically operating without utilizing additional energy and therefore do not utilize an additional energy source.

Figure 13:
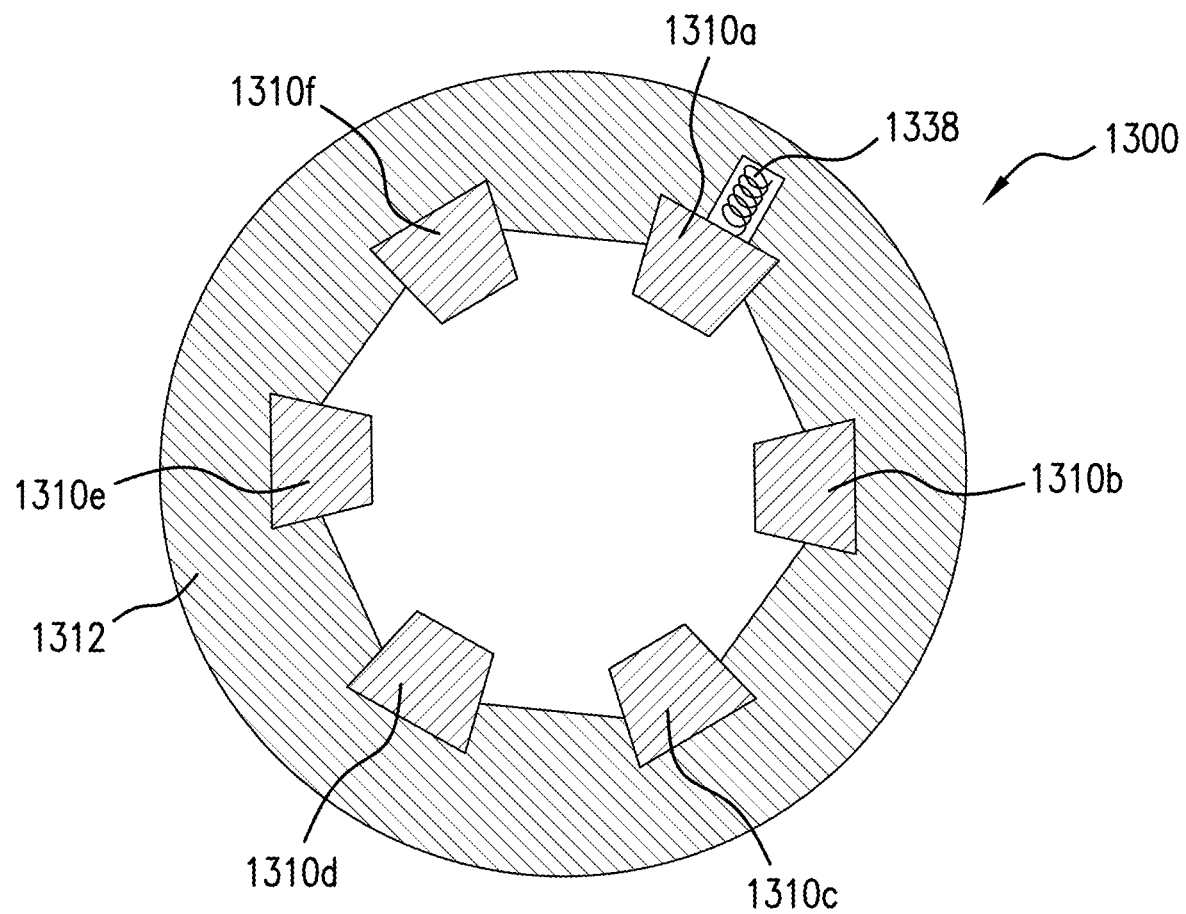
FIG. 13 is a schematic illustration of a damping system in accordance with an embodiment of the present disclosure.
Figure 14:
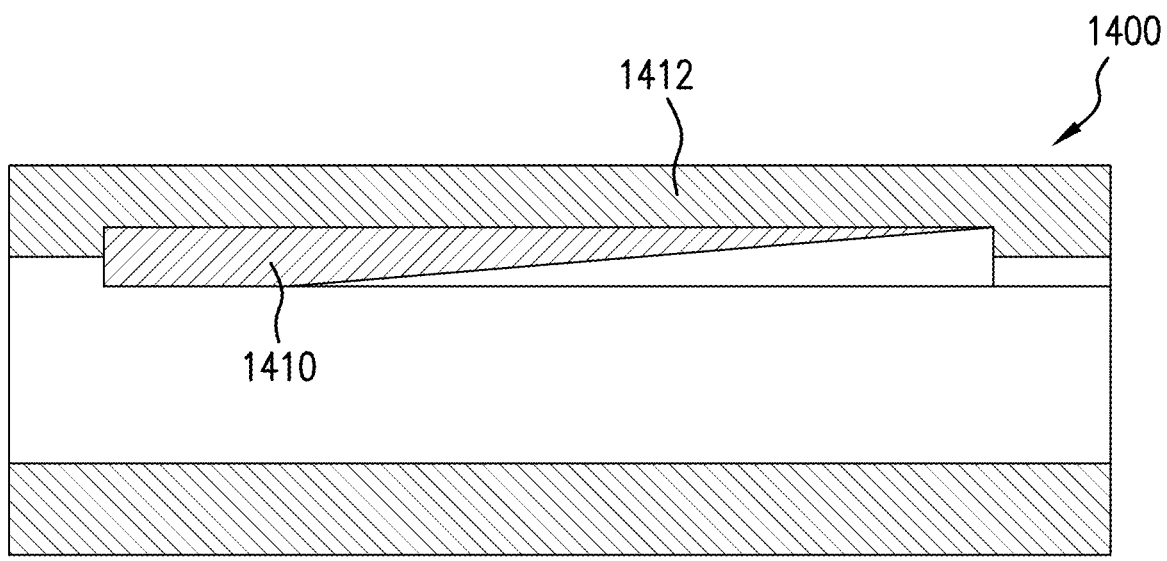
FIG. 14 is a schematic illustration of a damping system in accordance with an embodiment of the present disclosure.

Turning now to FIG. 13, a schematic illustration of a damping system 1300 in accordance with an embodiment of the present disclosure is shown. In this embodiment, the damping system 1300 includes one or more elongated first elements 1310a, 1310b, 1310c, 1310d, 1310e, 1310f, each of which is arranged within and in contact with a second element 1312. Each of the first elements 1310a, 1310b, 1310c, 1310d, 1310e, 1310f may have a length in an axial tool direction (e.g., in a direction perpendicular to the cross-section that is shown in FIG. 13) and optionally a fixed point where the respective first elements 1310a, 1310b, 1310c, 1310d, 1310e, 1310f are fixed to the second element 1312. For example, the first elements 1310a, 1310b, 1310c, 1310d, 1310e, 1310f can be fixed at respective upper ends, middle portions, lower ends, or multiple points of fixation for the different first elements 1310a, 1310b, 1310c, 1310d, 1310e, 1310f, or multiple points for a given single first element 1310a, 1310b, 1310c, 1310d, 1310e, 1310f Further, as shown in FIG. 13, the first elements 1310a, 1310b, 1310c, 1310d, 1310e, 1310f can be optionally biased or engaged to the second element 1312 by a biasing element 1338 (e.g., by a biasing spring element or a biasing actuator applying a force with a component toward the second element 1312). Each of the first elements 1310a, 1310b, 1310c, 1310d, 1310e, 1310f can be arranged and selected to have the same or different normal forces, static or dynamic friction coefficients, and mass moments of inertia, thus enabling various damping configurations.

In some embodiments, the first elements may be substantially uniform in material, shape, and/or geometry along a length thereof. In other embodiments, the first elements may vary in shape and geometry along a length thereof. For example, with reference to FIG. 14, a schematic illustration of a damping system 1400 in accordance with an embodiment of the present disclosure is shown. In this embodiment, a first element 1410 is arranged relative to a second element 1412, and the first element 1410 has a tapering and/or spiral arrangement relative to the second element 1412. Accordingly, in some embodiments, a portion of the first or second element can change geometry or shape along a length thereof, relative to the second element, and such changes can also occur in a circumferential span about or relative to the second element and/or with respect to a tool body or downhole system.

Figure 15:
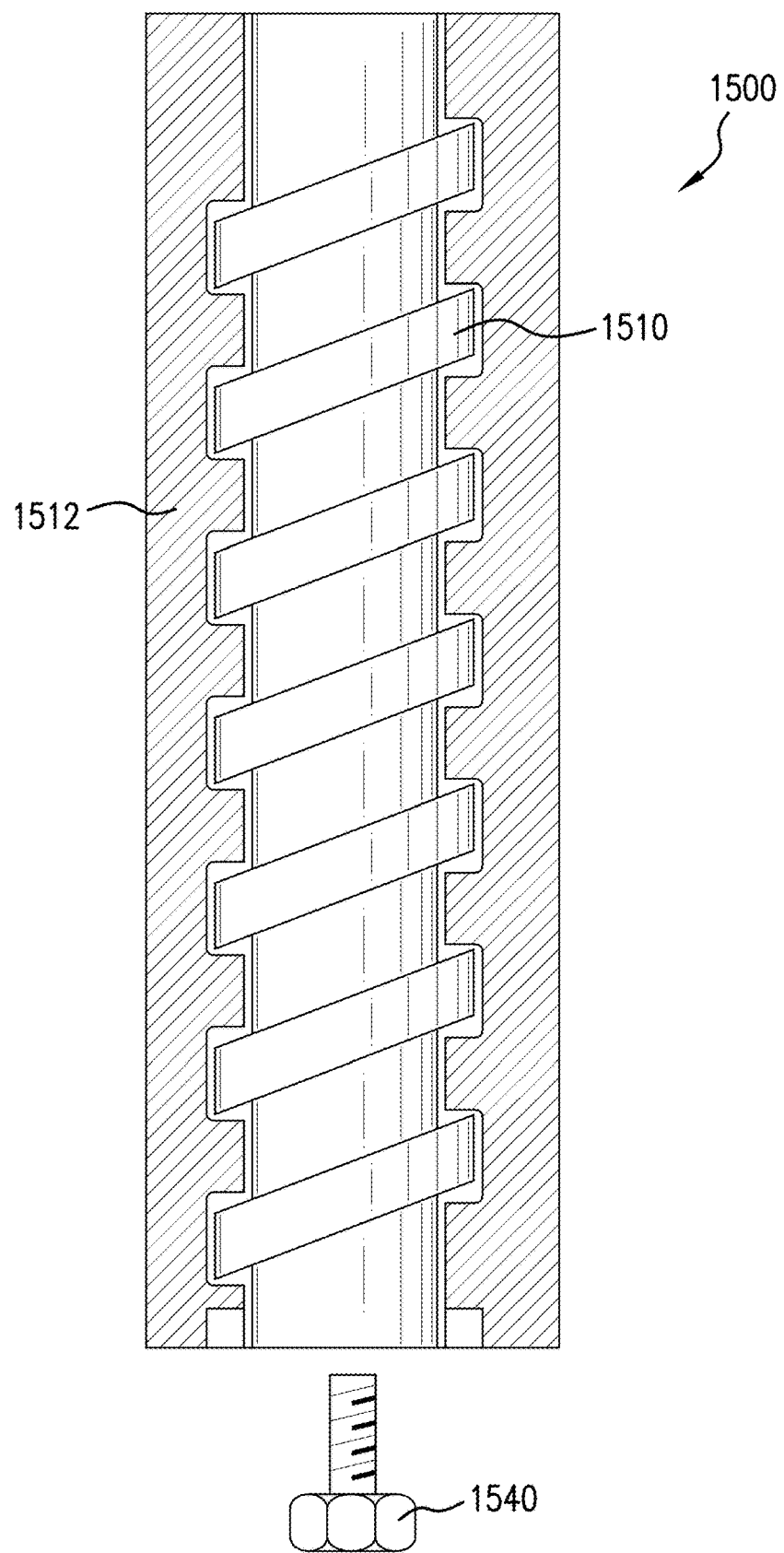
FIG. 15 is a schematic illustration of a damping system in accordance with an embodiment of the present disclosure.

Turning now to FIG. 15, a schematic illustration of another damping system 1500 in accordance with an embodiment of the present disclosure is shown. In the damping system 1500, a first element 1510 is a toothed (threaded) body that is fit within a threaded second element 1512. The contact between the teeth (threads) of the first element 1510 and the threads of the second element 1512 can provide the frictional contact between the two elements 1510, 1512 to enable damping as described herein. Due to the slanted surfaces of the first element 1510, the first element 1510 will start to move under both axial and/or torsional vibrations. Further, movement of first element 1510 in an axial or circumferential direction will also create movement in the circumferential or axial direction, respectively, in this configuration. Therefore, with the arrangement shown in FIG. 15, axial vibrations can be utilized to mitigate or damp torsional vibrations as well as torsional vibrations can be utilized to mitigate or damp axial vibrations. The locations where the axial and torsional vibrations occur may be different. For example, while the axial vibrations may be homogeneously distributed along the drilling assembly, the torsional vibrations may follow a mode shape pattern as discussed above with respect FIGS. 9A-9B. Thus, irrespective of where the vibrations occur, the configuration shown in FIG. 15 may be utilized to damp torsional vibrations with the movement of the first element 1510 relative to the second element 1512 caused by the axial vibrations and vice versa. As shown, an optional tightening element 1540 (e.g., a bolt) can be used to adjust the contact pressure or normal force between the two elements 1510, 1512, and thus adjust the frictional force and/or other damping characteristics of the damping system 1500.

Figure 16:
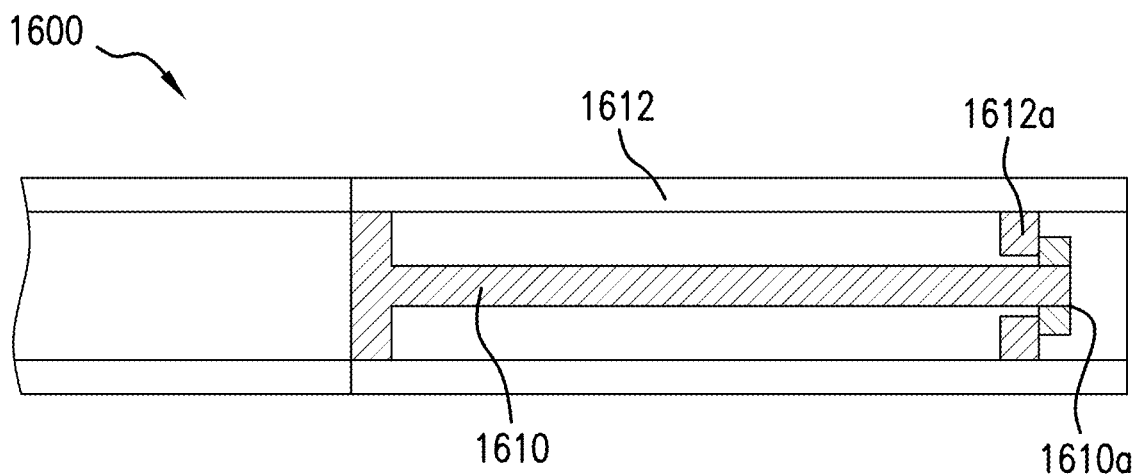
FIG. 16 is a schematic illustration of a damping system in accordance with an embodiment of the present disclosure.

Turning now to FIG. 16, a schematic illustration of a damping system 1600 in accordance with another embodiment of the present disclosure is shown. The damping system 1600 that includes a first element 1610 that is a stiff rod that is at one end fixed within a second element 1612. In this embodiment, a rod end 1610a is arranged to frictionally contact a second element stop 1612a to thus provide damping as described in accordance with embodiments of the present disclosure. The normal force between the rod end 1610a and the second element stop 1612a may be adjustable, for example, by a threaded connection between the rod end 1610a and the first element 1610. Further, the stiffness of the rod could be selected to optimize the damping or influence the mode shape in a beneficial way to provide a larger relative displacement. For example, selecting a rod with a lower stiffness would lead to higher amplitudes of the torsional oscillations of the first element 1610 and a higher energy dissipation.

Figure 17:
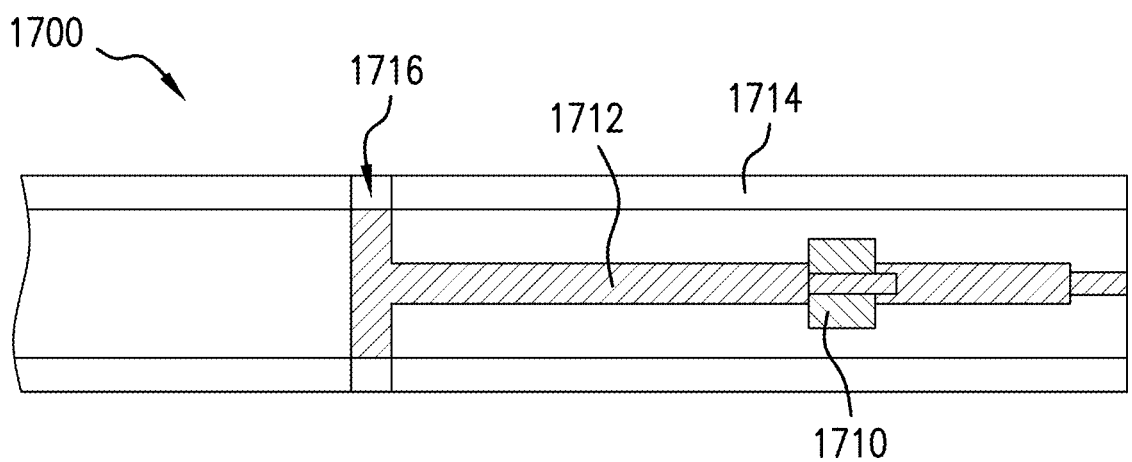
FIG. 17 is a schematic illustration of a damping system in accordance with an embodiment of the present disclosure.

Turning now to FIG. 17, a schematic illustration of a damping system 1700 in accordance with another embodiment of the present disclosure is shown. The damping system 1700 that includes a first element 1710 that is frictionally attached or connected to a second element 1712 that is arranged as a stiff rod and that is fixedly connected (e.g., by welding, screwing, brazing, adhesion, etc.) to an outer tubular 1714, such as a drill collar, at a fixed connection 1716. In one aspect, the rod may be a tubular that includes electronic components, power supplies, storage media, batteries, microcontrollers, actuators, sensors, etc. that are prone to wear due to HFTO. That is, in one aspect, the second element 1712 may be a probe, such as a probe to measure directional information, including one or more of a gravimeter, a gyroscope, and a magnetometer. In this embodiment, the first element 1710 is arranged to frictionally contact, move, or oscillate relative to and along the fixed rod structure of the second element 1712 to thus provide damping as described in accordance with embodiments of the present disclosure. While the first element 1710 is shown in FIG. 17 to be relatively small compared to the damping system 1700, it is not meant to be limited in that respect. Thus, the first element can 1710 can be of any size and can have the same outer diameter as the damping system 1700. Further, the location of the first element 1710 may be adjustable in order to move the first element 1710 closer to a mode shape maximum to optimize damping mitigation.

Figure 18:
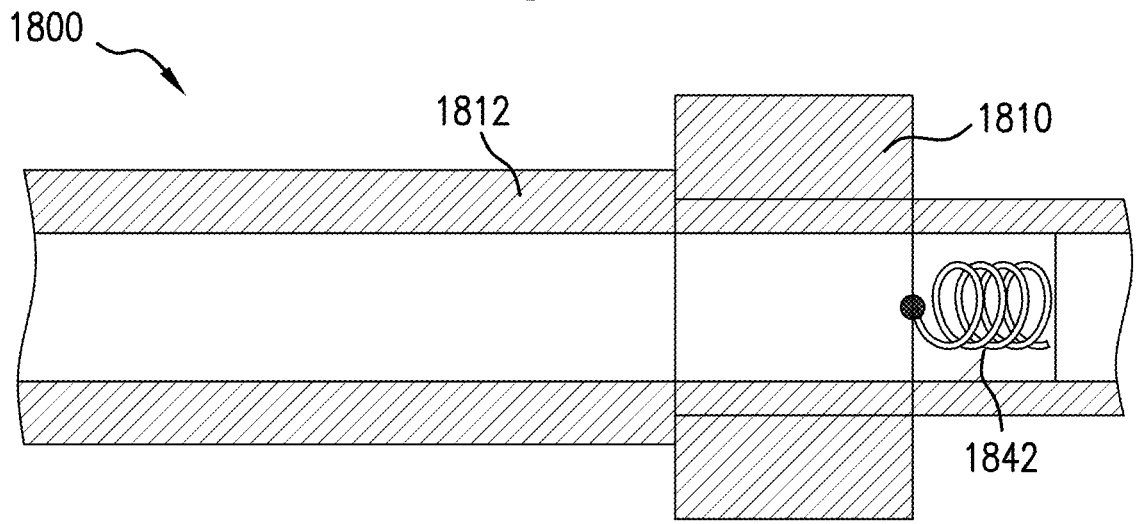
FIG. 18 is a schematic illustration of a damping system in accordance with an embodiment of the present disclosure.

Turning now to FIG. 18, a schematic illustration of a damping system 1800 in accordance with another embodiment of the present disclosure is shown. The damping system 1800 that includes a first element 1810 that is frictionally movable along a second element 1812. In this embodiment, the first element 1810 is arranged with an elastic spring element 1842, such as a helical spring or other element or means, to engage the first element 1810 with the second element 1812, and to thus provide a restoring force when the first element 1810 has moved and is deflected relative to the second element. The restoring force is directed to reduce the deflection of the first element 1810 relative to the second element 1812. In such embodiments, the elastic spring element 1842 can be arranged or tuned to resonance and/or to a critical frequency (e.g., lowest critical frequency) of the elastic spring element 1842 or the oscillation system comprising the first element 1810 and the elastic spring element 1842.

Figure 19:
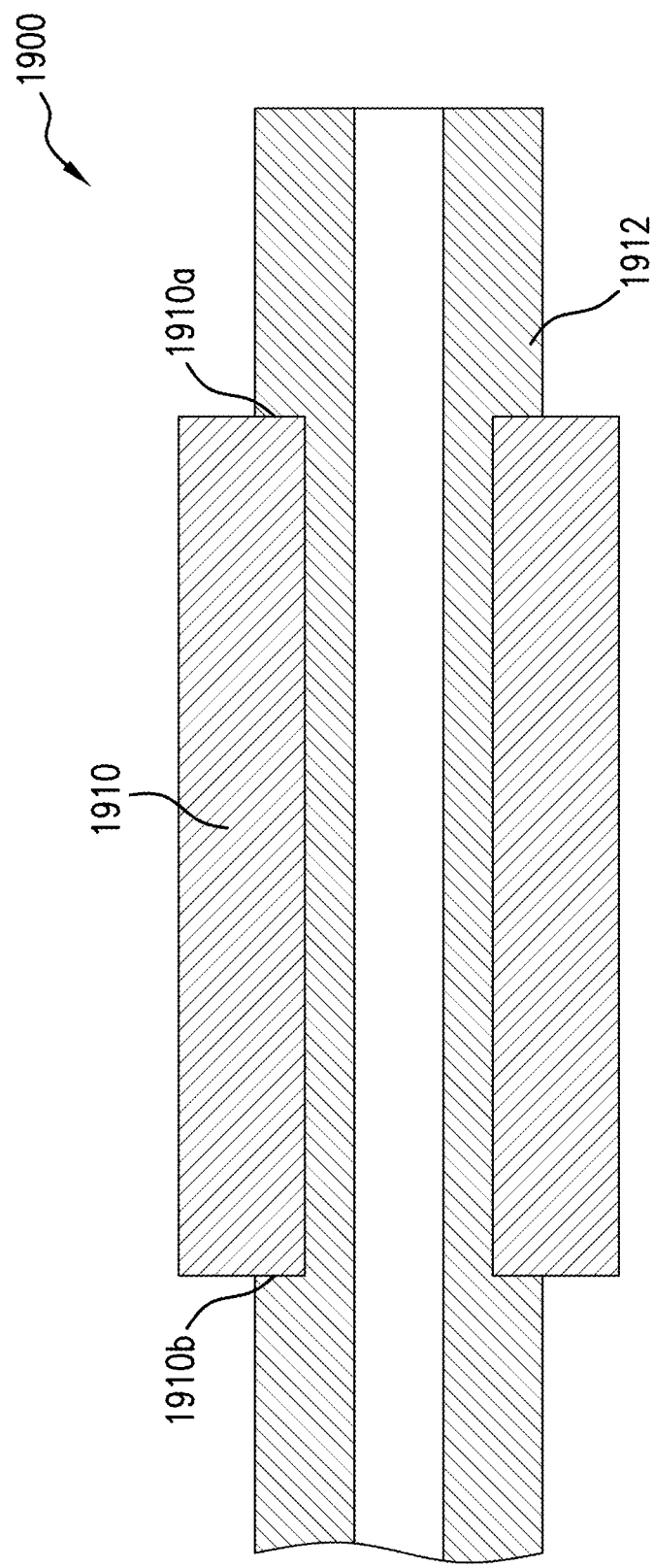
FIG. 19 is a schematic illustration of a damping system in accordance with an embodiment of the present disclosure.

Turning now to FIG. 19, a schematic illustration of a damping system 1900 in accordance with another embodiment of the present disclosure is shown. The damping system 1900 that includes a first element 1910 that is frictionally movable about a second element 1912. In this embodiment, the first element 1910 is arranged with a first end 1910a having a first contact (e.g., first end normal force $F_{N1}$, first end static or dynamic friction coefficient $\mu_i$, and first end moment of inertia $J_i$) and a second contact at a second end 1910b (e.g., second end normal force $F_{Ni}$, second end static or dynamic friction coefficient $\mu_i$, and second end moment of inertia $J_i$). In some such embodiments, the type of interaction between the respective first end 1910a or second end 1910b and the second element 1912 may have a different physical characteristics. For example, one or both of the first end 1910a and the second end 1910b may have a sticking contact/engagement and one or both may have a sliding contact/engagement. The arrangements/configurations of the first and second ends 1910a, 1910b can be set to provide damping as described in accordance with embodiments of the present disclosure.

Advantageously, embodiments provided herein are directed to systems for mitigating high-frequency torsional oscillations (HFTO) of downhole systems by application of damping systems that are installed on a rotating string (e.g., downhole string or drill string). The first elements of the damping systems are, at least partially, frictionally connected to move circumferentially relative to an axis of the string (e.g., frictionally connected to rotate about the axis of the string). In some embodiments, the second elements can be part of a drilling system or bottomhole assembly and does not need to be a separately installed component or weight. The second element, or a part thereof, is connected to the downhole system in a manner that relative movement between the first element and the second element has a relative velocity of zero or close to zero (i.e., no or slow relative movement) if no HFTO exists. However, when HFTO occurs above a distinct acceleration value, the relative movement between the first element and the second element is possible and alternating plus and minus relative velocities are achieved. In some embodiments, the second element can be a mass or weight that is connected to the downhole system. In other embodiments, the second element can be part of the downhole system (e.g., part of a drilling system or BHA) with friction between the first element and the second element, such as the rest of the downhole system providing the functionality described herein.

As described above, the second elements of the damping systems are selected or configured such that when there is no vibration (i.e., HFTO) in the string, the second element will be frictionally connected to the first element by the static friction force. However, when there is vibration (HFTO), the second elements become moving with respect to the first element and the frictional contact between the first and the second element is reduced as described above with respect to FIG. 2, such that the second element can rotate (move) relative to the first element (or vice versa). When moving, the first and second elements enable energy dissipation, thus mitigating HFTO. The damping systems, and particularly the first elements thereof, are positioned, weighted, forced, and sized to enable damping at one or more specific or predefined vibration modes/frequencies. As described herein, the first elements are fixedly connected when no HFTO vibration is present but are then able to move when certain accelerations (e.g., according to HFTO modes) are present, thus enabling damping of HFTO through a zero crossing of a relative velocity (e.g., switching between positive and negative relative rotational velocities).

In the various configurations discussed above, sensors can be used to estimate and/or monitor the efficiency and the dissipated energy of a damper. The measurement of displacement, velocity, and/or acceleration near the contact point or surface of the two interacting bodies, for example in combination with force or torque sensors, can be used to estimate the relative movement and calculate the dissipated energy. The force may also be known without a measurement, for example, when the two interacting bodies are engaged by a biasing element, such as a spring element or an actuator. The dissipated energy could also be derived from temperature measurements. Such measurement values may be transmitted to a controller or human operator which may enable adjustment of parameters such as the normal force and/or the static or dynamic friction coefficient(s) to achieve a higher dissipated energy. For example, measured and/or calculated values of displacement, velocity, acceleration, force, and/or temperature may be sent to a controller, such as a micro controller, that has a set of instructions stored to a storage medium, based on which it adjusts and/or controls at least one of the force that engages the two interacting bodies, and/or the static or dynamic friction coefficients. Preferably, the adjusting and/or the controlling is done while the drilling process is ongoing to achieve optimum HFTO damping results.

While embodiments described herein have been described with reference to specific figures, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed, but that the present disclosure will include all embodiments falling within the scope of the appended claims or the following description of possible embodiments.

Severe vibrations in drill strings and bottomhole assemblies can be caused by cutting forces at the bit or mass imbalances in downhole tools such as drilling motors. Negative effects are among others reduced rate of penetration, reduced quality of measurements and downhole failures.

Different sorts of torsional vibrations exist. In the literature the torsional vibrations are mainly differentiated into stick/slip of the whole drilling system and high-frequency torsional oscillations (HFTO). Both are mainly excited by self-excitation mechanisms that occur due to the interaction of the drill bit and the formation. The main differentiator between stick/slip and HFTO is the frequency and the typical mode shape: In case of HFTO the frequency is above 50 Hz compared to below 1 Hz in case of stick/slip. Further the excited mode shape of stick/slip is the first mode shape of the whole drilling system whereas the mode shape of HFTOs are commonly localized to a small portion of the drilling system and have comparably high amplitudes at the bit.

Due to the high frequency HFTO corresponds to high acceleration and torque values along the BHA and can have damaging effects on electronics and mechanical parts. Based on the theory of self-excitation increased damping can mitigate HFTOs if a certain limit of the damping value is reached (since self-excitation is an instability and can be interpreted as a negative damping of the associated mode).

One damping concept is based on friction. Friction between two parts in the BHA or drill string can dissipate energy and reduce the level of torsional oscillations.

In this idea a design principle is discussed that to the opinion of the inventors works best for damping with friction. The damping shall be achieved by a friction force where the operating point of the friction force with respect to the relative velocity has to be around point 204 shown in FIG. 2. This operating point leads to a high energy dissipation because a friction hysteresis is achieved whereas point 202 of FIG. 2 will lead to energy input into the system.

As discussed above, friction forces between the drilling system and the borehole will not generate significant additional damping in the system. This is because the relative velocity between the contact surfaces (e.g. a stabilizer and the borehole) does not have a zero mean value. The two interacting bodies of the friction damper must have a mean velocity or rotary speed relative to each other that is small enough so that the HFTO leads to a sign change of the relative velocity of the two interacting bodies of the friction damper. In other words, the maximum of the relative velocities between the two interacting bodies generated by the HFTO needs to be higher than the mean relative velocity between the two interacting bodies.

Energy dissipation only occurs in a slipping phase via the interface between the damping device and the drilling system. Slipping occurs if the inertial force exceeds the limit between sticking and slipping that is the static friction force: $F_R > \mu_0 \cdot F_N$ (wherein the static friction force equals the static friction coefficient multiplied by the normal force between both contacting surfaces). The normal force and/or the static or dynamic friction coefficient may be adjustable to achieve an optimal or desired energy dissipation. Adjusting at least one of the normal force and the static or dynamic friction coefficient may lead to an improved energy dissipation by the damping system.

As discussed herein, the placement of the friction damper should be in the area of high HFTO accelerations, loads, and/or relative movement. Because different modes can be affected a design is preferred that is able to mitigate all HFTO modes (e.g., FIGS. 9A and 9B).

Figure 21:
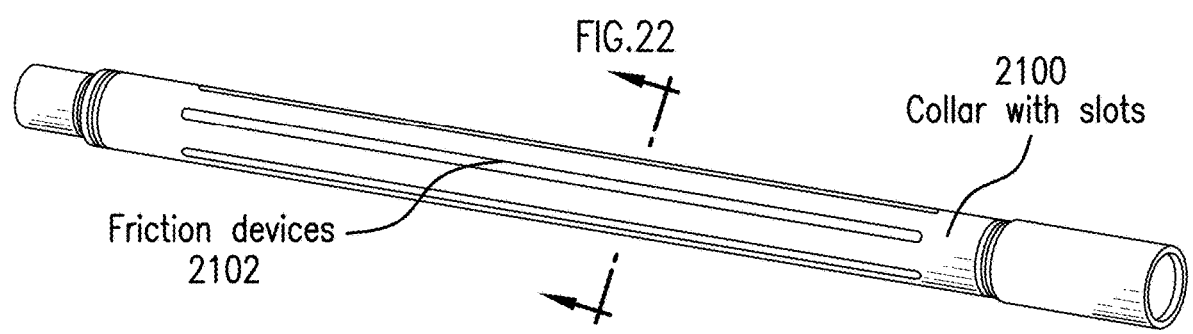
FIG. 21 is a schematic illustration of a downhole tool having a damping system.
Figure 22:
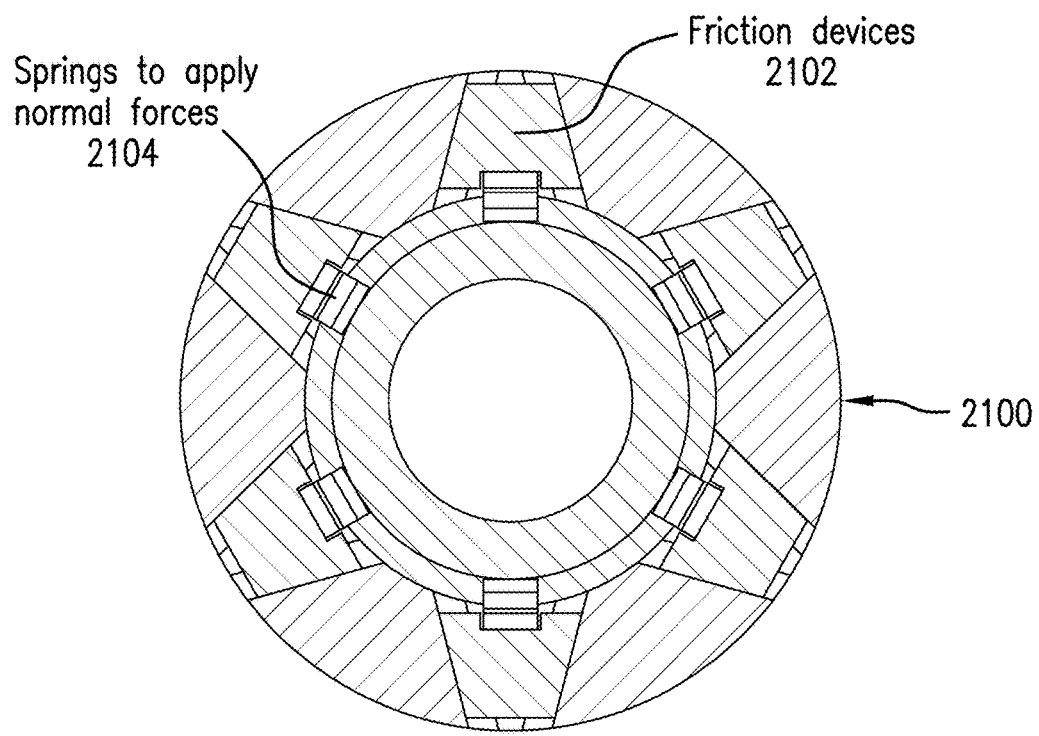
FIG. 22 is a cross-sectional illustration of the downhole tool of FIG. 21.

An equivalent can be used as a friction damper tool of the present disclosure. A collar with slots 2100, as shown in FIGS. 21 and 22, can be employed. A cross-sectional view of the collar with slots 2100 is shown in FIG. 22. In one non-limiting embodiment, the collar with slots 2100 has a high flexibility and will lead to higher deformations if no friction devices 2102 are entered. The higher velocity will cause higher centrifugal forces that will force the friction devices 2102 to be pressed into the slots with optimized normal forces to allow high friction damping. In this configuration, other factors that can be optimized are the number and geometry of slots as well as the geometry of the damping devices. An additional normal force can be applied by spring elements 2104, as shown in FIG. 22, actuators, and/or by centrifugal forces, as discussed above.

The advantage of this principle is that the friction devices will be directly mounted into the force flow. A twisting of the collar due to an excited HFTO mode and corresponding mode shape will partly be supported by the friction devices that will move up and down during one period of vibration. The high relative movement along with an optimized friction coefficient and normal force will lead to a high dissipation of energy.

This goal is to prevent an amplitude increase of the HFTO amplitudes (represented by tangential acceleration amplitudes in this case). The (modal) damping that has to be added to every instable torsional mode by the friction damper system needs to be higher than the energy input into the system. The energy input is not happening instantaneously but over many periods until the worst case amplitude is reached (zero RPM at the bit).

With this concept a comparably short collar can be used because the friction damper uses the relative movement along the distance from bit. It is not necessary to have a high tangential acceleration amplitude but only some deflection ("twisting") of the collar that will be achieved in nearly every place along the BHA. The collar and the dampers should have a similar mass to stiffness ratio ("impedance") compared to the BHA. This would allow the mode shape to propagate in the friction collar. A high damping will be achieved that will mitigate HFTO if the parameters discussed above are adjusted (normal force due to springs etc.). The advantage in comparison to other friction damper principles is the application of the friction devices directly into the force flow of the deflection to a HFTO mode. The comparably high relative velocity between the friction devices and the collar will lead to a high dissipation of energy.

The damper will have a high benefit and will work for different applications. HFTO causes high costs due to high repair and maintenance efforts, reliability issues with non-productive time and small market share. The proposed friction damper would work below a motor (that decouples HFTO) and also above a motor. It could be mounted in every place of the BHA that would also include a placement above the BHA if the mode shape propagates to this point. The mode shape will propagate through the whole BHA if the mass and stiffness distribution is relatively similar. An optimal placement could for example be determined by a torsional oscillation advisor that allows a calculation of critical HFTO-modes and corresponding mode shapes.

Furthermore, as noted above, due to the high amplitudes at the drill bit, one location of a damper, as described herein, may be within the drill bit or located proximate the bit, such as within or on a bit support assembly. That is, in accordance with some embodiments of the present disclosure, the dampers may be integrated into and part of a bit support assembly. In such embodiments, the distance-to-bit is substantially zero. Bit support assemblies, as described herein, include, without limitation, bit boxes, drive shafts, sleeves associated with the securing and driving/operation of a bit, steering units and/or elements associated with steering a drilling operation, bend mechanisms that are used in a bend motor to steer, elements to engage with a borehole wall, non- or slow-rotating sleeves, etc. The bit support assemblies of the present disclosure may be part of a BHA that includes elements other than a disintegration device, and in some instances may include the disintegration device if such device is integrally formed with a portion of the bit support assembly.

A steering unit (also referred to as the steering section or steering assembly) is employed and configured for drilling directional boreholes. This directional drilling may be referred to in the art as geosteering. The steering unit, in one non-limiting example, includes a number of expandable members (e.g., force application members) located on a non-rotating sleeve (e.g., tool sleeve) that are configured to apply selected or predetermined forces on a borehole wall for drilling directional of boreholes. While applying forces on the borehole wall, the non-rotating sleeve remains geo-stationary or rotates only slowly relative to the borehole wall, while the drive shaft, which runs through the non-rotating sleeve, rotates with the rotational speed of the disintegration device (e.g., bit RPM). The expandable members may be operated by an actuation mechanism (e.g., hydraulic, electrical, or electromechanical actuation mechanism).

In some such embodiments, a damper may be formed of a mass or inertia that is only coupled through a damping force or damping torque to the bit support assembly. The damping force could, for example, and without limitation, be generated by viscous damping, friction damping, hydraulic damping, magnetic damping (e.g., eddy current damping), piezoelectric (shunt) damping, etc. In some such embodiments, the damper may be combined with a spring that would enable a tuned mass damper or a tuned friction damper. In these cases the eigenfrequency of the damper would be tuned to the eigenfrequency of the mode that shall be damped.

As discussed above, analysis have shown that the damping proportionally increases with the effective rotational inertia and quadratically increases with the mass normalized mode shape at the bit. An additional constant factor is dependent on the type of damping. Further friction damping with an inertia damper is theoretically independent of the frequency and hydraulic dampers have some frequency dependency. This trade-off also applies for other types of damping and can be influenced by means of different parameters of the forces (e.g., by harmonically adjusting the normal force for friction damper configurations, choosing fluids that have properties that change with relative velocity of components, etc.). As noted, the bit box or bit is one location for the inertia damper that may be beneficial because the critical modes typically have the largest amplitude at the bit (e.g., as shown in FIG. 9B). One example critical mode is at 248 Hz, having the largest amplitude at the bit, although various other modes/frequencies may be critical based on a specific configuration and operation downhole. That is, the critical mode(s) may be dependent on various considerations, and the 248 Hz mode is described merely as an example for purposes of explanation. It is important to note that the excitability theoretically also increases quadratically with the amplitude of the mode shape at the bit. Further, the amount of damping needed to mitigate vibrations may also increase quadratically with the mode shape amplitude at the bit.

In one non-limiting embodiment of a damper located proximate to a bit, but not at/within the bit, a friction damper may be a closed-ring with any shape that is connected to a bit support assembly and is configured to torsionally rotate. In another embodiment, the damper may be a linear mass that is connected in a tangential direction at or in a bit support assembly and configured to effectively lead to a rotational force. Several individual dampers may be installed and configured about or in a bit support assembly (i.e., proximate the end of a drill string). In another configuration, the damper may be formed from two forcedly connected parts of the bit support assembly that are connected to different axial positions of the bit support assembly (e.g., proximate a bit connection and proximate a connection to drive shaft). The connection at different axial positions results in a relative movement between the two forcedly connected parts. An example of such configuration may include, for example, a threaded connection with relative contact surfaces.

Figure 23:
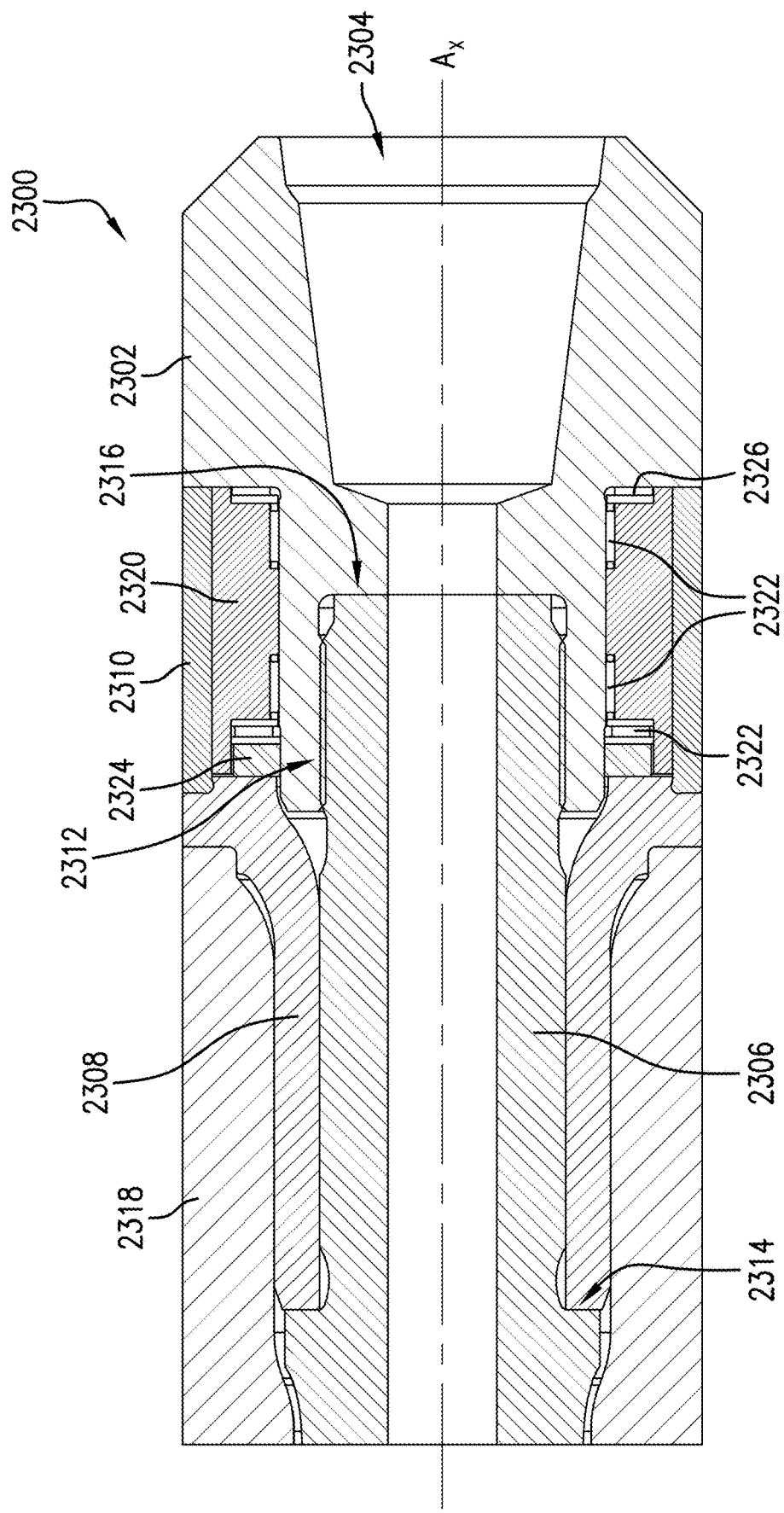
FIG. 23 is a schematic illustration of a bit support assembly incorporating a damper element in accordance with an embodiment of the present disclosure.

For example, turning to FIG. 23, a schematic illustration of a bit support assembly 2300 is shown. The bit support assembly 2300 includes a bit box 2302 that is configured to receive a bit within a bit cavity 2304. The bit cavity 2304 is configured (e.g., shaped, sized, etc.) to receive a drill bit or other disintegration device therein. The bit box 2302 is configured to retain and, in some configurations, drive operation of a bit installed within the bit cavity 2304, as will be appreciated by those of skill in the art. The bit, or other disintegration device, may be configured to cut material of a formation (e.g., rock) during a drilling operation.

As shown, the bit box 2302 is mounted within the bit support assembly 2300 to a drive shaft 2306. The drive shaft 2306 may be rotated to drive operation (e.g., rotation) of the bit that is mounted to/in the bit cavity 2304. In operation, a drilling torque is transmitted from the drive shaft 2306 to the bit box 2304 by a torque-sleeve 2308 and a cover-sleeve 2310. A threaded connection 2312 creates an axial pretension between the drive shaft 2306 and the bit box 2302. A torque is transmitted through friction between the various components of the bit support assembly 2300, which can depend upon axial surface pressure, coefficients of friction, and radius of contact surfaces relative to a tool axis $A_x$. A first shoulder surface 2314 of the torque-sleeve 2308, which contacts the drive shaft 2306, may be coated with a friction increasing-layer (e.g., diamond material) which enables an increase of torque transmission by a multiplying factor, as will be appreciated by those of skill in the art. A second shoulder surface 2316 providing contact between the drive shaft 2306 and the bit box 2302 can be configured to increase a make-up torque (MUT)-capability. Due to the coating at the first shoulder surface 2314, the torque-sleeve 2308 is not expected to observe relative movement relative to, for example, the drive shaft 2306. The cover-sleeve 2310 has a larger radius than the torque-sleeve 2308, i.e., relative to the tool axis $A_x$, and the transmissible torque at the first shoulder surface 2314 is greater than at the second shoulder surface 2316.

The typical design of a bit box or so called lower-drive-shaft is a double shoulder thread, as illustratively shown in FIG. 23. However, in some alternative configurations, the bit box, the torque-sleeve, and/or the bit may be pieced together as a single part/component. In such configurations, relative motion occurs in both shoulders (e.g., first and second shoulder surfaces 2314, 2316 shown in FIG. 23) while making up the connection. Therefore it is not possible to apply a friction increasing coating on the first shoulder surface, as described above. As such, this results in a significantly decreased transmissible torque due to the decreased coefficient of friction and a smaller effecting radius.

As shown, the drive shaft 2306 and torque-sleeve 2308 may be housed within a tool sleeve 2318. The tool sleeve 2318 may be a non-rotating sleeve or a slow-rotating sleeve, as will be appreciated by those of skill in the art. The tool sleeve 2318 may be configured to engage with or connect to a BHA or other downhole assembly and/or tool string.

As described above, various types of dampers may be incorporated into various aspects of a drilling system. In this illustrative embodiment shown the bit support assembly 2300, the bit support assembly 2300 includes a damper element 2320, illustratively shown as a rotation inertia. The damper element 2320, in this embodiment, is rotatory decoupled by various bearings 2322 (e.g., radial, such as needle bearings or PDC bearings, and/or axial bearings). The damper element 2320 is configured to be free and may rotate on the bit support assembly 2300 (e.g., relative to the bit box 2302 and/or torque-sleeve 2308). The damper element 2320 may be maximized by a high-density material and a geometry with specific characteristics. For example, as shown in FIG. 23, the volume of the damper element 2320 may be selected and/or optimized in a sense that the mass of the damper element 2320 has a specific or determined radial distance from the tool axis $A_x$. For example, as shown, the bearings 2322 (and the frictional contact) may be arranged radially closer to the tool axis $A_x$ than the damper element 2320 to leave space and an optimization of the cover-sleeve 2310 and damper element 2320. Such space enables ensuring that aspects of the damping system can withstand the expected loads during operation and enables selection of geometry and material of the damper element 2320 to maximize the rotational inertia and achieve a desired damping.

In some embodiments, as shown, an axial spring 2324 may be arranged to apply an axial force to the damper element 2320. In this illustrative configuration, the axial spring 2324 is arranged to transmit axial force through a bearing 2322 (e.g., an axial bearing) and to the damper element 2320 to a friction surface 2326 between the damper element 2320 and the bit box 2302. The friction surface 2326 can be, in some embodiments, substituted by any other kind of damping force mechanism. The axial contact pressure and the existing coefficient of friction at the friction surface 2326 creates a frictional coupling between the damper element 2320 and the bit box 2302. The spring stiffness of the axial spring 2324 and the friction coefficient at the friction surface 2326 may be selected to achieve a maximum of the damping with respect to the amplitude that does not compromise a tool life of the bit support assembly 2300 and/or a bit installed thereto.

As shown in FIG. 23, the damper element 2320 is encapsulated by the cover-sleeve 2310. The cover-sleeve 2310 is selected to withstand the outer hydrostatic pressure, which may be based on a wall thickness and may consider an outer diameter of the damper element 2320. In some embodiments, the damper element 2320 (illustratively shown as a physical component) may be configured in the form of a viscous damper. In some such embodiments, the installation location of the damper element 2320 may be filled with a fluid and a pressure compensation may give room for increasing the outer diameter of the damper element by achieving design space in the dimension of the cover sleeve and other parts. By way of a non-limiting example, the fluid may be an incompressible fluid. In another embodiment, the cover-sleeve 2310 may be omitted. In some such embodiments, a maximum outer diameter of the damper element can be obtained, and in some such embodiment mud-resistant damper elements would be required due to exposure to the external environment of the borehole. The inertial mass or damper element, in this context, could be adjusted to cover parts of the bending load that are required to be transferred. A mud exposed system could also include a cover sleeve that is partially slotted to cover the bending on the one hand but also leave more design space of the inertia mass/damper element that could partially fill the slots between the cover sleeves.

In some embodiments of the present disclosure, a purely rotational damper may installed within the bit support assembly and such configuration would benefit from the high mode shape amplitude at or proximate the bit. Some such installations may cause a smaller radial location of the damper elements, i.e., closer to the tool axis $A_x$. As such, the smaller radius of the damper element may limit the damping effect, but such limitation may be compensated by the fact that a higher mass could be placed at the bit support assembly. That is, the selection of the mass and radial position relative to the tool axis $A_x$ may be determined based on a desired vibration or mode to be damped and based on the energy input, expected excitation that could be described by a negative damping (e.g., as shown in FIG. 20).

By locating damper elements within or at the bit support assembly (e.g., at or in the bit box or other part of a steering assembly), a sufficient amount of damping can be achieved to minimize or eliminate downhole vibrations. The reason is that, in almost all instances, the mass normalized mode shape amplitude of a critical mode shape is the largest at the bit or disintegration device. This can be physically explained by the fact that the excitability and the likelihood that a mode is excited also increases quadratically with the mode shape amplitude at the bit (or point of excitation) if a velocity-weakening torque characteristic at the bit is assumed with respect to the average rotary speed. Incorporating the damper/damper element in the bit support assembly may impose limits upon the axial length of the damper/damper element. However, as the damping is high due to the high amplitude of the mode shape at or close to the bit, the damper/damper element may be relatively short and still achieve a sufficient damping effect. The damper at the bit support assembly may be smaller than 30 cm, or 40 cm, or 50 cm, or 100 cm, or 150 cm.

One type of damper element that may be installed within or at a bit support assembly, in accordance with the present disclosure, is a linear viscous damper. Such a damper element would include a mass and a force element that transmits the force from the bit support assembly to the mass/inertia. Such damper element would have a force element that points, is arranged, or is orientated into a tangential direction to damp HFTO. The force element could be a linear viscous or friction damping element, as will be appreciated by those of skill in the art in view of the teachings herein.

The damper element 2320 may be a single or multiple elements/structures. For example, the damper element 2320 may be an inertia ring or other ring-type structure that may be a closed or an interrupted ring, e.g., half shells. In some embodiments, two half shells (or other partial shells) may be employed when a full ring is not enabled due to a bit or bit support assembly design or configuration. The half shells may be assembled around a radial friction contact or a radial bearing (e.g., some of bearings 2322) which may be arranged relative to and similar in position and shape as the inner diameter of the damper element 2320. The bearing(s) can also be separated to allow mounting of the bearings 2322 and/or the damper element 2320. In some embodiments, a normal force may be applied through the half shells and controlled by the elasticity of the half shells and the normal/connection force that is applied. In some embodiments, radial wave spring shells could also be used to apply radial friction forces between, for example, half shells of a damper element and the radial friction.

Different geometries may be employed for the damper element(s) (e.g., inertia ring) that could be beneficial to increase the inertia. In this sense, the density of the material selected for the damper element may be selected to be as high as possible, with the radius of the mass distribution being on a large radius with respect to the axial axis of the drilling system or bit support assembly. The inertia (or inertia half shells) could incorporate additional masses (inertia) that are preferably mounted or arranged around the bit support assembly.

In some embodiments, a limit stop may optionally be provided to prevent a ring-configuration damper element from moving freely or continuously (e.g., more than 10° rotation). The normal forces between the damper element and the bit box or other part of the bit support assembly can be applied radially or axially through springs or other mechanisms. Radial friction forces could be achieved by springs or by an elastic design of the ring-style damper element. In some such embodiments, a double half-shell damper element may be pre-stressed to achieve a desired friction force. An axial normal force can be achieved by springs, with the weight of the mass/inertia in a vertical borehole and the springs could be built by shells etc. The material of the bit support assembly could be steel body or matrix (e.g., composites). An axial bearing could be used to decouple a potential normal force spring stack or another normal-force application element from the rotational movement of the inertia mass.

In some embodiments, tangential damper elements may be employed within a bit box or other part of a bit support assembly. The dampers for tangential damping could be mounted into a position of high radius with respect to the axial axis of the drilling system (e.g., radially relative to the tool axis AO.

In case of the dampers that are mounted free to move in the tangential direction (direction of tangential acceleration) (steel) tubes that are screwed into the bit support assembly could be used. The tangential dampers could be assembled into the tubes, incorporating a mechanism to apply normal forces between the inertia mass (i.e., damper element) and the support assembly (e.g., bit box)—preferably orthogonal to the tangential direction. In some embodiments, tangential damper elements may be installed into or part of a respective housing that can be fixed to the bit box or other part of the bit support assembly, e.g., through threaded connections. The housings can be of any geometry that can be mounted to various locations of the bit support assembly.

As described above, in accordance with embodiments of the present disclosure, a damper element or assembly is described that consists, in some configurations, of a rotational inertia damper element that may be only coupled to the drilling system through a damping force or torque to the upper part of a drive shaft. The damping force could, for example, be generated by viscous damping, friction damping, piezoelectric or magnetic damping, e.g., of eddy current type, etc. as will be appreciated by those of skill in the art and in view of the teachings herein. In some embodiments, the damper element may be combined with a spring that may enable a tuned mass damper or a tuned friction damper. In some such embodiments, the eigenfrequency of the damper and the adjusted force elements that provide stiffness (e.g., a spring) and damping may be tuned to the eigenfrequency of the mode that shall be damped.

The bit is connected to a support assembly (e.g., bit box) having a damper element as described above. In some configurations, a different thread connection between a lower drive shaft and the bit support assembly may be employed that allows for the optional incorporation of a friction ring inertia damper. The damper element may be protected by a cover sleeve that is frictionally connected at the upper and the lower end. The cover sleeve does not necessarily provide damping because the normal forces ideally prevent sliding motion between the contact surfaces between the cover sleeve and the other components of the bit support assembly (e.g., bit box and tool sleeve). The friction forces are controlled by the friction coefficient and the normal force that is caused by the threaded connection between the lower drive shaft and the bit support assembly.

In accordance with some embodiments of the present disclosure, the damper element (e.g., inertia damper) is a ring that is placed below the cover sleeve. The damper element is able to freely rotate with respect to the drilling system, the bit support assembly, or other structures. In some embodiments, mass of the damper element may be provided by a non-magnetic material to prevent interaction and/or interference with measurements from a magnetometer that can be placed proximate the bit and/or bit support assembly. Similarly, the material of the damper element can be selected to minimize or prevent negative effects on formation evaluation measurements or other downhole measurement or operations. As noted, above, in some embodiments, the damper element may be supported by a radial bearing that is frictionless or substantially frictionless. The damper element (e.g., inertia ring) is configured to interact with the drilling system through the friction surfaces, such as at a contact or other surface between the damper element and the bit support assembly (e.g., friction surface 2326 shown in FIG. 23). In some embodiments, the various friction surfaces are axially aligned. The normal force in the friction surface is applied by an axial spring (e.g., axial spring 2324 shown in FIG. 23). The friction coefficient is based on the material properties of the frictionally interacting surfaces. In some embodiments, the axial spring can be rotationally decoupled from the inertia by an axial bearing.

Figure 24:
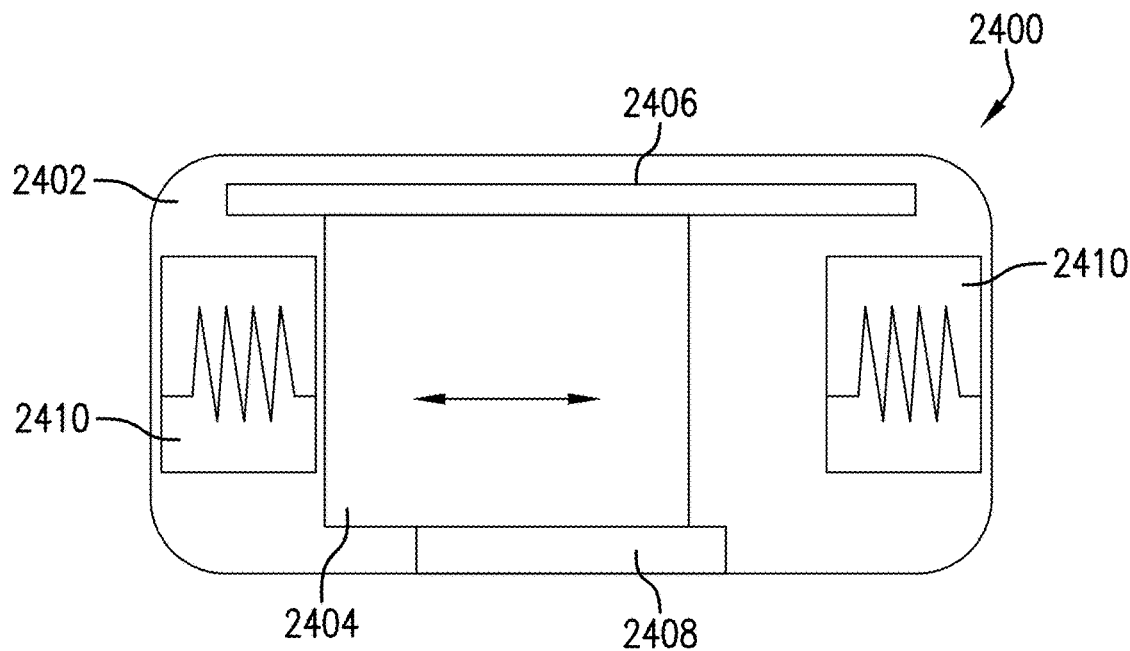
FIG. 24 is a schematic illustration of a tangential damper element in accordance with an embodiment of the present disclosure.
Figure 25:
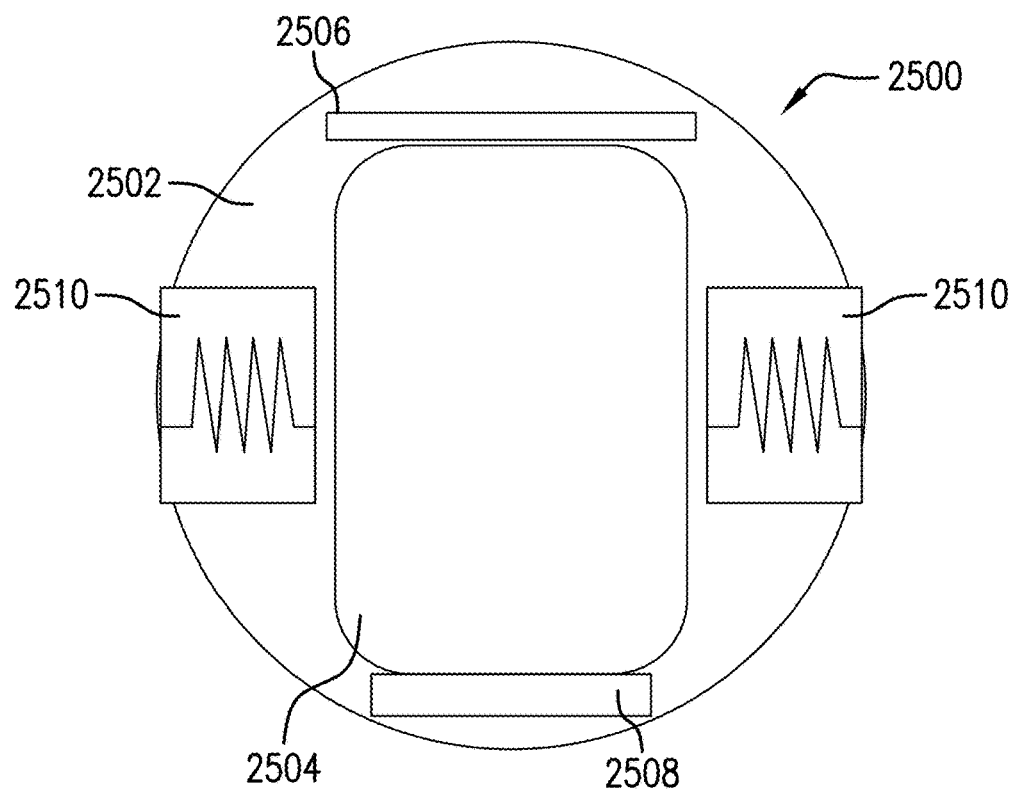
FIG. 25 is a schematic illustration of a tangential damper element in accordance with an embodiment of the present disclosure.

Turning now to FIGS. 24-25, schematic illustrations of damper elements 2400, 2500 are shown. The damper elements 2400, 2500 are configured for installation within a bit support assembly, as described above. Each damper element 2400, 2500 includes a respective housing 2402, 2502 for housing and containing the components of the respective damper elements 2400, 2500. A first damper element 2400 has a substantially rectangular geometry (with curved corners) and a second damper element 2500 has a substantially circular geometry. The housings 2402, 2502 are configured to installation into bit support assemblies (e.g., as shown in FIG. 23).

The damper elements 2400, 2500 each include a mass element 2404, 2504 movably mounted within the housings 2402, 2502. The mass element 2404, 2504 is arranged between a mounting element 2406, 2506 and a contact element 2408, 2508. The mounting elements 2406, 2506 are configured to apply a force upon the respective mass element 2404, 2504 toward the contact elements 2408, 2508. As such, a frictional contact may be achieved between the respective mass element 2404, 2504 and the contact elements 2408, 2508. The mass elements 2404, 2504 may be arranged with one or more limit stops 2410, 2510 within the respective housings 2402, 2502. The limit stops 2410, 2510 may include optional stiffness or hydraulic elements for damping of the movement of the mass elements 2404, 2504, Furthermore, the limit stops 2410, 2510 may prevent the mass elements 2404, 2504 from being stuck in one edge of the housing 2402, 2502. The limit stops 2410, 2510 can be configured with springs or other elements to avoid damage to the mass elements 2404, 2504 and to urge the mass elements 2404, 2504 toward a middle or rest position relative to the housing. In some embodiments, it may be beneficial to optimize a spring stiffness and/or gap in the housing 2402, 2502 to allow the mass elements 2404, 2504 to move within the housing 2402, 2502. The damper elements 2400, 2500 may be arranged as inserts (e.g., the housing 2402, 2502 is configured for installation). The insertable damper elements 2400, 2500 may be installed such that the mass elements 2404, 2504 are placed at a position of high radius with respect to an axis (e.g., the axial axis) of a drilling system, to increase the rotational inertia with respect to this axis that increase the damping.

The mounting element 2406, 2506 are configured to apply a normal force upon the mass elements 2404, 2504. For example, the mounting element 2406, 2506 may be arranged as spring shells to urge the mass elements 2404, 2504 into contact with the contact element 2408, 2508. Furthermore, the mounting elements 2406, 2506 and/or the contact elements 2408, 2508 can be configured to control a tangential movement of the mass elements 2404, 2504 to enable damping of HFTO. In some embodiments, the mounting elements 2406, 2506 urge the mass elements 2404, 2504 into contact with the contact element 2408, 2508 to generate a friction force. The friction force is applied, for example, through a material that is beneficial with respect to the friction coefficient and the expected wear that should be as low as possible.

In accordance with embodiments of the present disclosure, integration of damping into a bit support assembly may be achieved. The damping may be applied by any axial, tangential, and/or radial force or corresponding torque that is able to dissipate energy. In case of coupled modes, damping forces in an axial direction is also able to dissipate energy from the torsional direction. As described for friction damping, contacting surfaces applied with a friction coefficient and normal force may be optimized and/or selected for damping one or more critical modes. In some embodiments, beneficial materials or designs may be employed to prevent wear (e.g., copper or polycrystalline diamond cutters). Multiple contacts with different properties could be used to tune the system to a beneficial friction coefficient or characteristic. In some embodiments, the damper element is configured to move relative to the bit support assembly (e.g., bit box) with a velocity that is a sum of a periodic velocity fluctuation having an amplitude and a mean velocity, wherein the mean velocity is lower than the amplitude of the periodic velocity fluctuation.

Dependent on the kind of force that is applied different configurations are possible. As discussed above, FIG. 2 describes a typical force characteristic for frictional contacts. The force characteristic has a velocity weakening effect for relative velocities that are not close to zero. As discussed above a harmonic or periodic relative movement between two elements would lead to an energy input into the system. Further, as described above a damping in this case is only effective with a relative movement of the interacting surfaces close to zero (e.g., point 204 in FIG. 2). An alternative (or in combination with a friction damper) may be a viscous damper.

Figure 26:
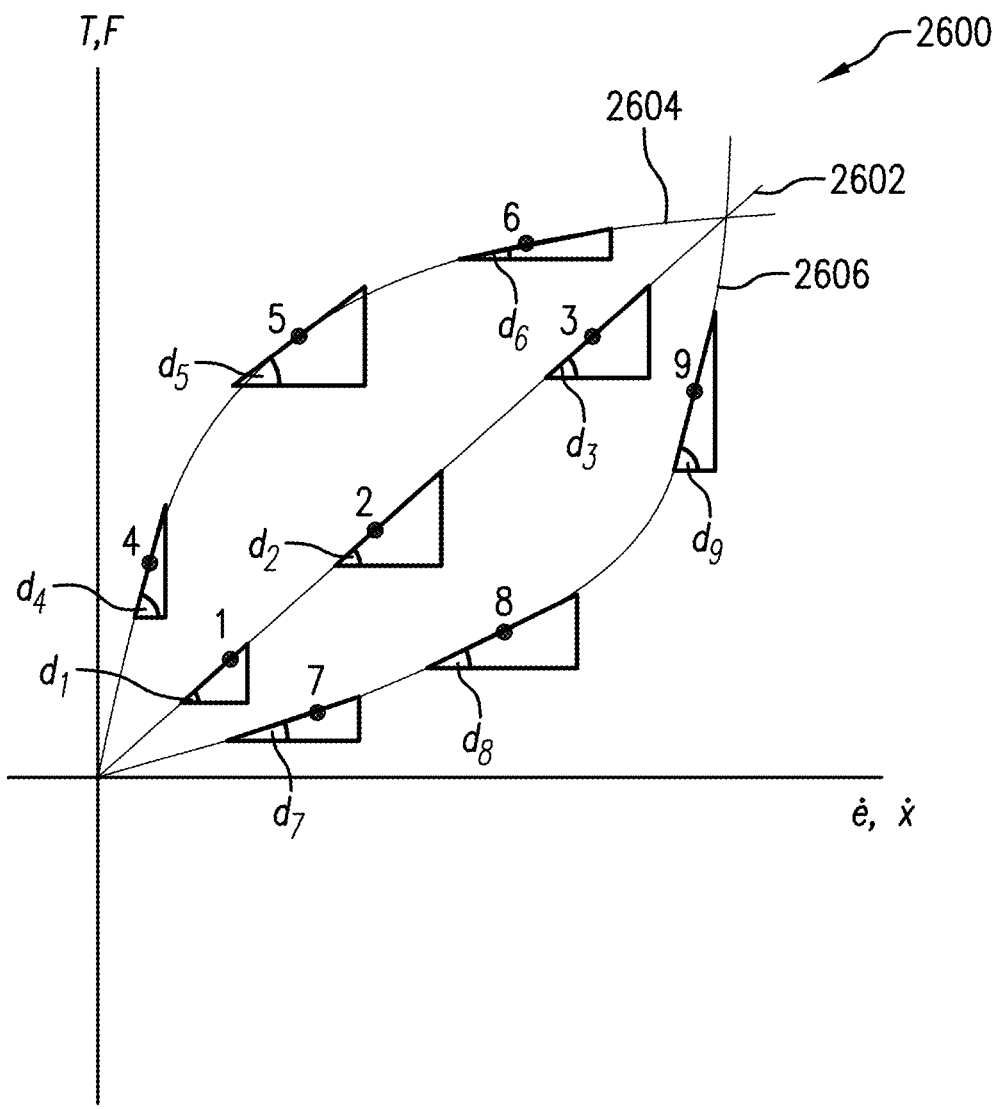
FIG. 26 is an illustrative plot of a typical curve of force or torque versus relative velocity or relative rotational speed between two interacting bodies associated with a hydraulic damper element.

Turning now to FIG. 26, a plot 2600 of different characteristics of torque (T)/force (F) of viscous fluids with respect to the relative displacement ($\dot{e}$, $\dot{x}$) (e.g., relative movement/velocity) between two parts that are connected by a kind of connecting force are illustratively shown. In this plot, curve 2602 represents the properties of a Newtonian fluid, curve 2604 represents the properties of a shear-thinning non-Newtownian fluid, and curve 2606 represents the properties of a shear-thickening non-Newtownian fluid. Although the plot 2600 is illustrative of fluids, such principles may apply to other types of dampers, such as contactless damping (e.g., eddy current damping). On plot 2600, curve 2602 includes points 1, 2, 3, curve 2604 includes points 4, 5, 6, and curve 2606 includes points 7, 8, 9. The points 1-9 represent difference relationships of torque T or force F with respect to relative displacement ($\dot{e}$, $\dot{x}$).

In plot 2600, the slope of the curves 2602, 2604, 2606, e.g., at points 1-9, is positive and a relative movement (including a mean velocity $\dot{e}$, $\dot{x}$ at that point and a fluctuation of the relative displacement, velocity, or acceleration with respect to forcedly connected parts that is caused by a periodic superimposed oscillation, e.g., caused by HFTO) with respect to these points would provide damping to the system. A relative movement could, for example, occur between one part that is connected to the borehole wall, e.g., by sticking friction in the tangential direction, as existing with a non-rotating sleeve of a steering unit. Two interacting bodies that are forcedly connected by this kind of characteristic would also provide damping of HFTO if a positive mean rotary speed is applied. The downside is that this kind of characteristic would also lead to a mean static force (T, F in FIG. 26 and corresponding to points 1-9) from the contacting surfaces that is reducing the power from the rotation that can be used for rock destruction. That is, the damper acts as a break for the rotation of the downhole system. Therefore, in such instances, higher power might be needed at a surface rotary system that drives a cutting action at a bit.

The damping that is needed is linearly dependent on the slope of the different torque-versus-relative displacement curves that can be named as a viscous damping coefficient d ($d_1$-$d_9$) in FIG. 26 and quadratically increasing with a mass normalized mode shape amplitude, e.g., as shown in FIG. 9B. The static dissipated energy from the constant relative movement is also linearly increasing with the viscous damping coefficient d. Because the mode shape amplitude is very localized and is very high at the bit and therefore the relative movement between two forcedly connected surfaces as described above is high, the static energy dissipation is also high and the damping is effective. As a result of the localized and high mode shape amplitude, the length of the damper may be relatively short (e.g., axially). The breaking force of a relatively short damper is smaller than the breaking force of a relatively longer damper. Therefore, the trade-off between the damping that is dynamically provided, to mitigate HFTO, and the (not wanted) static energy dissipation is particularly good near to the bit or a bit support assembly.

Figure 27:
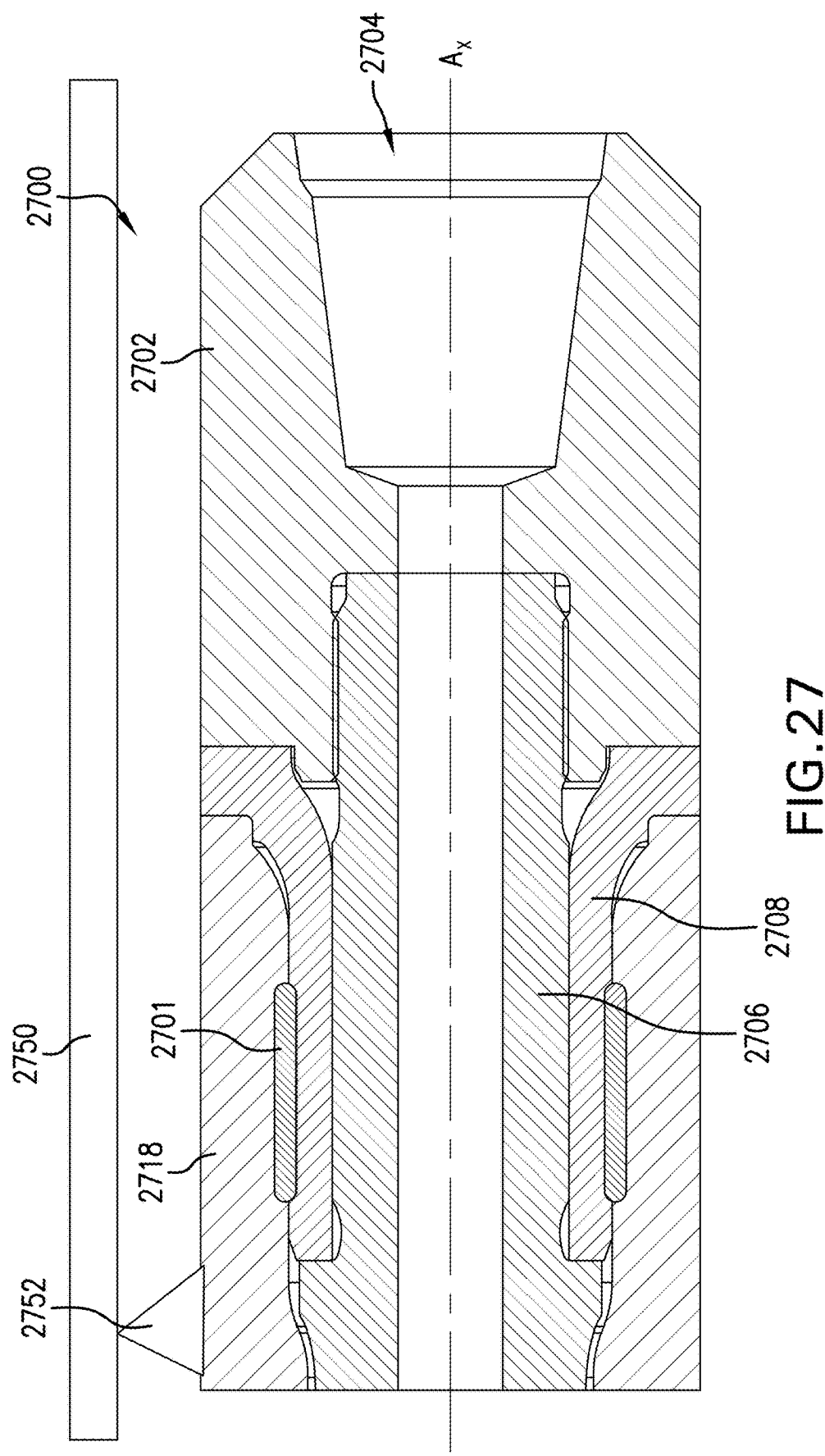
FIG. 27 is a schematic illustration of a bit support assembly incorporating a damper element in accordance with an embodiment of the present disclosure.

Turning now to FIG. 27, a bit support assembly 2700 having a damper element 2701 in the form of a viscous or eddy current damper is shown. The bit support assembly 2700 may be similar to that shown and described above, having a bit box 2702 attached to a drive shaft 2706, with the bit box 2702 configured with a bit cavity 2704 to receive a bit or other disintegration device. The drive shaft 2706 and a torque-sleeve 2708 may be housed within a tool sleeve 2718. The tool sleeve 2718 may be a non-rotating sleeve or a slow-rotating sleeve, as will be appreciated by those of skill in the art. The tool sleeve 2718 may be configured to engage with or connect to a BHA or other downhole assembly and/or tool string, such as a steering unit. In this embodiment, as shown, the tool sleeve 2718 may engage with a borehole wall 2750 using a force application member 2752, such as a rib or multiple ribs, extension devices, etc. as will be appreciated by those of skill in the art. A tool sleeve may include, for example, three force application members. The assembly could also incorporate a type of non-rotating stabilizer, as known in the art.

The torque-sleeve 2708 and the drive shaft 2706 will rotate to drive the bit box 2702 and thus a bit or disintegration device installed therein. However, the tool sleeve 2718 may be forcedly connected to the borehole wall 2750 with the force application member 2752. In some non-limiting embodiments, the force application member 2752 may be a steering device that applies forces to change a direction of a drilling operation. As a result, the tool sleeve 2718 has a mean rotary speed of nearly zero. Further, the force application member 2752 is decoupled from the dynamic content of HFTO that is excited by the disintegration device because bearings or any other decoupling device(s) is used between the torque-sleeve 2708 and the tool sleeve 2718.

The torque-sleeve 2708 is subject to loads from HFTO that is harmonic or periodic displacement, velocity, or acceleration and dynamic torsional torque. Therefore, a dynamic relative movement through HFTO is superimposed to the mean relative movement between the torque-sleeve 2708 and the tool sleeve 2718. This dynamic relative movement can be used to dampen HFTO within the bit support assembly 2700. The damping force is provided by the damper element 2701 and may be adjusted circumferentially or just on specific parts of the diameter and forcedly connects to the torque-sleeve 2708 and the tool sleeve 2718 by a damping force device with a characteristic that is similar to that described with respect to FIG. 26. Namely, in the operating points 1-9 in FIG. 26, a positive slope is needed with respect to the relative velocity (x-axis) and the transmitted force or torque. This behavior is not limited to hydraulic damping but could be achieved by any other damping forces or combination of damping forces as described herein. That is, the damper element 2701 may be a viscous or hydraulic damper, but is not so limited. For example, an eddy current damper may be employed that has a purely linear slope between torque and relative velocity similar to Newtonian fluids (curve 2602 shown in FIG. 26). In this context, two parts that are forcedly connected with or without a mean relative velocity close to zero or non-zero can be used to dampen the system if the relative movement has a dynamic content from the oscillations connected to HFTO. In this example one of the two forcedly connected parts has zero dynamic content because it is as an approximation decoupled from the dynamic movement of the bit support assembly, driveshaft, or similar parts that transmit the torque. Some energy from the oscillations can be transferred to the tool sleeve 2718 through the damping force at the damper element 2701. Therefore, it may be beneficial to design a tool sleeve 2718 or other component/part (e.g., tool string, downhole string, drilling system, BHA, etc.) that will not excessively vibrate by this mechanisms, e.g., by having a natural frequency different or a first natural frequency that is higher compared to an HFTO natural frequency of the bottomhole assembly or drilling system.

As such, one form of damping that may be employed in embodiments of the present disclosure is hydraulic damping. Such hydraulic damping may be implemented through a system, whether in the bit box, or arranged about or in other locations of a bit support assembly. In some such embodiments, a viscous fluid (e.g., viscous fluid in chambers) may be arranged and installed in similar locations as described above. In some such applications, the (shear) stresses in the fluid between the inertia ring/mass and the bit support assembly may be selected to achieve a (damping) force that is tangential to the tangential acceleration and associated harmonic movement to dampen HFTO. In the case of ring shearing, the fluid provides a damping force between the inertia ring and the bit support assembly (e.g., bit box). In this case, the ring may require a closed housing and, potentially, a well-defined geometry of the gaps between the ring and the housing that could also be achieved by the cover sleeve. In hydraulic damping, the viscous damping forces are sensitive to parameter changes of the gaps and the viscous fluid. Therefore, a temperature insensitive fluid may be preferred. Fluids with different shear stresses as a function of the shear rate can be used to achieve a beneficial behavior. Some such example fluids include, without limitation, Newtonian fluids, non-Newtonian fluid (e.g., dilatant, shear-thickening fluids, shear-thinning fluids, etc.), pseudoplastic, Bingham plastic, Bingham pseudoplastic fluids, etc.

Further, in some embodiments, magnetic damping can be employed. Magnetic damping may be achieved by a permanent magnet (e.g., mounted on an inertial ring or mass element) that is allowed to move relative to a coil and can be used to dampen HFTO. Depending on the magnetic principle, the dampening force characteristic is similar to hydraulic (e.g., eddy current) or friction (Hysteresis) forces. In some such configurations, the force would act in the direction of the tangential acceleration or any other direction that is able to lead to damping in the torsional direction or the direction that should be dampened.

Furthermore, in some embodiments, piezoelectric damping principles may be employed to prevent HFTO at the bit. A piezoelectric material that is connected to an inertia ring or to a tangential mass on one side and to the bit support assembly on the other side can be used. The electrodes of the piezoelectric material can be connected to a circuit incorporating coils, resistors, and capacitances or semi-active or active electronic components. A combination of the electrical components can be used to achieve beneficial damping characteristics between the inertia ring and the bit support assembly. A circuit could be adjusted to a natural frequency of the system to work as a tuned mass damper (i.e., for one or more desired modes). A resistor could be arranged to directly dissipate energy if the piezoelectric stack is deformed by the relative force between a mass element and the bit support assembly. Additionally, the stiffness of the piezoelectric material and the inertia ring mass could be tuned to a specific frequency as well. The electrodes of the piezoelectric material can be arranged to dampen torsional vibrations. The direction of the dampening forces can be different from the direction of the electrodes using the beneficial transformation effect from mechanical force-to-electrical signal that is suggested by the design of the piezoelectric actor. Well-known effects of piezoelectric coefficients are $D_{33}$ (electrodes in a direction of the force), $D_{31}$ (orthogonal to a direction of the force), and $D_{15}$ (shear stresses). The piezoelectric material can be placed to optimize or control the coupling between the mechanical and the electrical system for a specific mode or multiple mode shapes that are critical to HFTO. Further, various different materials that transfer mechanical force or stress or related loads into electrical signals can be used without departing from the scope of the present disclosure.

In addition, the internal damping and the resulting forces of materials can be used to reduce HFTO. That is, material damping can be achieved passively through the damping properties of high damping materials. Some such materials may include, without limitation, polymers, elastomers, rubber, etc. as well as the damping effect of multifunctional materials such as shape memory alloys. The material properties of some materials, such as shape memory alloys, can be actively influenced or controlled to achieve greater damping effects.

Other damping configurations are possible without departing from the scope of the present disclosure. For example, negative capacitances and semi-active components using switching techniques may be employed. Additional damping techniques and components may be used, and the above described embodiments and variations are provided for illustrative and explanatory purposes and are not intended to be limiting. All of the damping principles described herein can be adjusted to work as a tuned mass damper by adding mechanical springs adjusted to a specific frequency and by adding damping of any type. Further, one or more of the damping principles described herein (or other methods/mechanisms) can be combined in a multi-principle configuration. For example, ring-type inertia dampers can be combined with tangential mass inertia dampers installed within or attached to blades of a disintegration device. Furthermore, magnetic, hydraulic, friction, piezoelectric, and material damping forces and principles could be combined to achieve a robust damping effect, such as, for example, with respect to temperature.

As described above, one or more damper elements may be integrated into a bit box or other part of a bit support assembly. For example, a ring-type damper may be positioned in or about the bit support assembly, as shown and described. In some configurations, a damper inertia ring could be lubricated by mud or covered by a sleeve design. In some configurations, a closed or uninterrupted ring may be employed. In other configurations, partial arcs may be assembled about a bit support assembly (e.g., could be mounted if ring cannot be assembled otherwise). In some such embodiments, two half-ring arcs may be employed. In other embodiments, more than two ring arcs may be used to form a complete hoop (circumferential) structure or less than a complete hoop (circumferential) structure, depending on the specific configuration that is implemented.

In some embodiments, a broken-ring structure may be employed, where discrete masses are arranged about a portion of a bit support assembly. In another example, a full ring-structure may be arranged about the bit support assembly, but specific additional mass elements or features of the ring may be located relative to specific parts of a bit that is mounted to the bit support assembly (e.g., blades of a bit mounted in a bit box). One such example may have a relatively thick ring at a location relative to blades of a bit installed into a bit box and lower thickness to allow a flow of cuttings to pass along the bit support assembly.

In some embodiments, limit stop may be provided for a ring-type damper element and may prevent the ring to move freely about the circumference of a bit support assembly. Such limit stop may be provided in embodiments where the mass or higher mass is located behind or adjacent specific blades or other cutting elements of a bit mounted to the bit box. In such cases, the limit stop may ensure that the mass or increased mass remains in position relative to the cutting elements.

It will be appreciated that friction-type damper elements of the present disclosure may employ radial and/or axial friction forces. Radial friction forces could be achieved by springs or by an elastic design of an inertia ring that has two half-shells and is pre-stressed. An axial normal force can be achieved by springs, a weight of mass/inertia in a vertical hole, and/or springs could be built by shells etc. The material of the bit support assembly may be steel or matrix composite or other suitable material. In some embodiments, a bearing may be used in a radial direction to guarantee the movement of the inertial ring. That is, a bearing may be provided to ensure circumferential and/or tangential movement of a damper element. An axial bearing may be used to decouple a potential normal force spring stack from rotational movement.

In some embodiments, alternatively from a ring-type damper element, or in combination therewith, tangential damper elements may be implemented in or on other parts of a bit support assembly. In some such embodiments, the tangential damper elements may be installed within housings that are screwed into the bit support assembly (e.g., into a bit box). In some such configurations, one or more limit stops may be provided to prevent the tangential dampers from sticking or wedging into an edge or corner of the housing. Contact between the limit stop and a mass of the tangential damper may be achieved using springs or other biasing elements or structures. In some embodiments, the spring stiffness or a gap in the housing may be selected to allow the mass of the tangential damper to move within the housing, and thus enable damping of vibrations, as described above.

Adjustment elements that change the properties of the contact between the contacting elements in the bit support assembly may also be employed. For example, the normal force may be adjusted in a frictional contact. The gap between the two interacting surfaces that provide damping through relative movement can be increased or decreased to change the properties of the damping. For example, in the case of magnetic damping, the amount of damping is dependent upon the size of the gap, e.g., at the damper element 2701 shown in FIG. 27. Adjustment is possible for all parameters that influence damping, and is not limited to temperature, geometry, and/or electric field. Further, the efficiency of the damping device could be measured by load and acceleration or other vibration measurement sensing devices and provided to a feedback loop to enable further adjustment of the damping parameters as needed.

Accordingly, embodiments of the present disclosure are directed to locating a damping system, such as a ring-type damper or tangential damper, at or in a bit support assembly of a downhole system. By locating the damping system at or in the bit support assembly, improved damping of HFTO or other vibration modes may be achieved.

Embodiment 1

A system for damping torsional oscillations of downhole systems, the system comprising: a downhole string; a bit support assembly configured to support and receive a disintegration device, wherein the disintegration device is disposed on an end of the downhole string and mounted to the bit support assembly; and a damping system configured at least one of on and in the bit support assembly, the damping system comprising at least one damper element arranged in contact with a portion of the bit support assembly.

Embodiment 2

The system of any preceding embodiment, wherein the damper element is configured to move at least partially relative to the bit support assembly with a velocity that is a sum of a periodic velocity fluctuation having an amplitude and a mean velocity.

Embodiment 3

The system of any preceding embodiment, wherein the disintegration device is a bit that engages with a bit box of the bit support assembly.

Embodiment 4

The system of any preceding embodiment, wherein the bit support assembly comprises: a drive shaft; and a torque-sleeve, wherein the bit box is rotatably engaged with the drive shaft and the torque-sleeve is arranged in operable contact with the drive shaft.

Embodiment 5

The system of any preceding embodiment, wherein the bit box is threadedly connected to the drive shaft.

Embodiment 6

The system of any preceding embodiment, further comprising a tool sleeve arranged external to the torque-sleeve, wherein the at least one damper element is arranged between the torque-sleeve and the tool sleeve.

Embodiment 7

The system of any preceding embodiment, wherein the at least one damper element is mounted to the bit support assembly.

Embodiment 8

The system of any preceding embodiment, wherein the at least one damper element is a ring-type structure circumferentially arranged about the bit support assembly.

Embodiment 9

The system of any preceding embodiment, wherein the ring-type structure comprises two half shells arranged about the bit support assembly.

Embodiment 10

The system of any preceding embodiment, further comprising a cover sleeve arranged external to the at least one damper element such that the at least one damper element is positioned between the cover sleeve and the bit support assembly.

Embodiment 11

The system of any preceding embodiment, further comprising at least one bearing arranged to rotationally decouple movement of at least a part of the at least one damper element from movement of the bit support assembly.

Embodiment 12

The system of any preceding embodiment, wherein the at least one bearing comprises at least one of a radial bearing and an axial bearing.

Embodiment 13

The system of any preceding embodiment, further comprising an axial spring configured to urge at least a part of the at least one damper element into frictional engagement with the bit support assembly.

Embodiment 14

The system of any preceding embodiment, wherein the at least one damper element is a tangential damper element.

Embodiment 15

The system of any preceding embodiment, wherein the bit support assembly comprises a steering unit.

Embodiment 16

The system of any preceding embodiment, wherein the at least one damper element further comprises a limit stop arranged to prevent at least a part of the at least one damper element from rotating about the bit support assembly.

Embodiment 17

The system of any preceding embodiment, wherein the damping system is arranged to provide at least one of viscous damping, friction damping, hydraulic damping, piezoelectric damping, eddy current damping, and magnetic damping at the bit support assembly.

Embodiment 18

The system of any preceding embodiment, wherein the downhole string is a drill string, wherein the bit support assembly is mounted to an end of the drill string.

Embodiment 19

A method of damping torsional oscillations of a downhole system in a borehole, the method comprising: installing a damping system at least one of on and in a bit support assembly located on a downhole string of the downhole system, the bit support assembly having a disintegration device attached thereto, the damping system comprising: at least one damper element arranged in contact with a portion of the bit support assembly, wherein at least a part the damper element moves relative to the bit support assembly with a velocity that is a sum of a periodic velocity fluctuation having an amplitude and a mean velocity.

Embodiment 20

The method of any preceding embodiment, wherein the at least one damper element comprises a ring-type structure installed about the bit support assembly.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively, or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A system for damping torsional oscillations of downhole systems, the system comprising:
   a downhole string;
   a bit support assembly configured to support and receive a disintegration device, wherein the disintegration device is disposed on an end of the downhole string and mounted to the bit support assembly; and
   a damping system configured at least one of on and in the bit support assembly, the damping system comprising at least one damper element arranged in contact with a portion of the bit support assembly,
   wherein the damper element is configured to move at least partially relative to the bit support assembly with a velocity that is a sum of a periodic velocity fluctuation having an amplitude and a mean velocity.

2. The system of claim 1, wherein the disintegration device is a bit that engages with a bit box of the bit support assembly.

3. The system of claim 2, wherein the bit support assembly comprises:
   a drive shaft; and
   a torque-sleeve, wherein the bit box is rotatably engaged with the drive shaft and the torque-sleeve is arranged in operable contact with the drive shaft.

4. The system of claim 3, wherein the bit box is threadedly connected to the drive shaft.

5. The system of claim 3, further comprising a tool sleeve arranged external to the torque-sleeve, wherein the at least one damper element is arranged between the torque-sleeve and the tool sleeve.

6. The system of claim 1, wherein the at least one damper element is mounted to the bit support assembly.

7. The system of claim 1, wherein the at least one damper element is a ring-type structure circumferentially arranged about the bit support assembly.

8. The system of claim 7, wherein the ring-type structure comprises two half shells arranged about the bit support assembly.

9. The system of claim 1, further comprising a cover sleeve arranged external to the at least one damper element such that the at least one damper element is positioned between the cover sleeve and the bit support assembly.

10. The system of claim 1, further comprising at least one bearing arranged to rotationally decouple movement of at least a part of the at least one damper element from movement of the bit support assembly.

11. The system of claim 10, wherein the at least one bearing comprises at least one of a radial bearing and an axial bearing.

12. The system of claim 1, further comprising an axial spring configured to urge at least a part of the at least one damper element into frictional engagement with the bit support assembly.

13. The system of claim 1, wherein the at least one damper element is a tangential damper element.

14. The system of claim 1, wherein the bit support assembly comprises a steering unit.

15. The system of claim 1, wherein the at least one damper element further comprises a limit stop arranged to prevent at least a part of the at least one damper element from rotating about the bit support assembly.

16. The system of claim 1, wherein the damping system is arranged to provide at least one of viscous damping, friction damping, hydraulic damping, piezoelectric damping, eddy current damping, and magnetic damping at the bit support assembly.

17. The system of claim 1, wherein the downhole string is a drill string, wherein the bit support assembly is mounted to an end of the drill string.

18. A method of damping torsional oscillations of a downhole system in a borehole, the method comprising:
   installing a damping system at least one of on and in a bit support assembly located on a downhole string of the downhole system, the bit support assembly having a disintegration device attached thereto, the damping system comprising:
   at least one damper element arranged in contact with a portion of the bit support assembly, wherein at least a part the damper element moves relative to the bit support assembly with a velocity that is a sum of a periodic velocity fluctuation having an amplitude and a mean velocity.

19. The method of claim 18, wherein the at least one damper element comprises a ring-type structure installed about the bit support assembly.

20. A system for damping torsional oscillations of downhole systems, the system comprising:
   a downhole string;
   a bit support assembly configured to support and receive a disintegration device, wherein the disintegration device is disposed on an end of the downhole string and mounted to the bit support assembly;
   a damping system configured at least one of on and in the bit support assembly, the damping system comprising at least one damper element arranged in contact with a portion of the bit support assembly; and
   at least one bearing arranged to rotationally decouple movement of at least a part of the at least one damper element from movement of the bit support assembly.

\* \* \* \* \*